US008814661B2

(12) United States Patent
Thorne et al.

(10) Patent No.: US 8,814,661 B2
(45) Date of Patent: Aug. 26, 2014

(54) GAMING MACHINES HAVING NORMAL AND HOT MODES

(75) Inventors: Michael R. Thorne, Sun Valley, NV (US); Bryan D. Wolf, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 13/331,248

(22) Filed: Dec. 20, 2011

(65) Prior Publication Data

US 2013/0157733 A1 Jun. 20, 2013

(51) Int. Cl.
*A63F 9/24* (2006.01)
*A63F 13/00* (2014.01)

(52) U.S. Cl.
USPC .................... 463/25; 463/16; 463/20; 463/42

(58) Field of Classification Search
USPC ............................................... 463/16, 20, 42
See application file for complete search history.

(56) References Cited

U.S. PATENT DOCUMENTS 4,743,022 A 5/1988 Wood
5,019,973 A 5/1991 Wilcox et al.
5,123,649 A 6/1992 Tiberio
5,178,390 A 1/1993 Okada
5,248,142 A 9/1993 Breeding
5,251,897 A 10/1993 Fulton
5,393,067 A 2/1995 Paulsen et al.
5,401,023 A 3/1995 Wood
5,411,257 A 5/1995 Fulton
5,494,287 A 2/1996 Manz
5,511,781 A 4/1996 Wood et al.
5,570,885 A 11/1996 Ornstein
5,586,766 A 12/1996 Forte et al.
5,613,912 A 3/1997 Slater
5,626,341 A 5/1997 Jones et al.
5,630,753 A 5/1997 Fuchs
5,655,961 A 8/1997 Acres et al.
5,719,431 A 2/1998 Werner
5,766,076 A 6/1998 Pease et al.
5,788,574 A 8/1998 Ornstein et al.
5,806,855 A 9/1998 Cherry
5,820,460 A 10/1998 Fulton
5,833,540 A 11/1998 Miodunski
5,839,730 A 11/1998 Pike
5,851,010 A 12/1998 Feinberg
5,851,147 A 12/1998 Stupak et al.
5,876,284 A 3/1999 Acres et al.
5,911,418 A 6/1999 Adams
(Continued)

FOREIGN PATENT DOCUMENTS

AU 2000/065501 B2 5/2001
EP 0 558 307 A2 2/1993
(Continued)

*Primary Examiner* — Dmitry Suhol
*Assistant Examiner* — Jason Yen
(74) *Attorney, Agent, or Firm* — Neal, Gerber & Eisenberg LLP

(57) ABSTRACT

Various embodiments of the present disclosure provide an electronic gaming machine having a default mode in which the electronic gaming machine provides a default average expected payback percentage for each play of a wagering game, and a different second hot mode in which the electronic gaming machine provides an increased average expected payback percentage for each play that wagering game. In The electronic gaming machine is in the default mode for certain periods of play, and is in the hot mode for certain periods of play when, in certain embodiments, a random determination is made that the hot mode will be employed. In various embodiments, players are not informed that the electronic gaming machine is in the hot mode.

20 Claims, 8 Drawing Sheets

(56) References Cited

U.S. PATENT DOCUMENTS

| | | | |
|---|---|---|---|
| 5,967,893 A | 10/1999 | Lawrence et al. | |
| 6,004,207 A | 12/1999 | Wilson, Jr. et al. | |
| 6,012,983 A | 1/2000 | Walker et al. | |
| 6,039,648 A | 3/2000 | Guinn et al. | |
| 6,050,895 A | 4/2000 | Luciano, Jr. et al. | |
| 6,062,981 A | 5/2000 | Luciano, Jr. | |
| 6,068,552 A | 5/2000 | Walker et al. | |
| 6,077,163 A | 6/2000 | Walker et al. | |
| 6,113,492 A | 9/2000 | Walker et al. | |
| 6,135,884 A | 10/2000 | Hedrick et al. | |
| 6,155,925 A | 12/2000 | Giobbi et al. | |
| 6,159,097 A | 12/2000 | Gura | |
| 6,186,894 B1 | 2/2001 | Mayeroff | |
| 6,203,429 B1 | 3/2001 | Demar et al. | |
| 6,213,877 B1 | 4/2001 | Walker et al. | |
| 6,217,448 B1 | 4/2001 | Olsen | |
| 6,224,483 B1 | 5/2001 | Mayeroff | |
| 6,227,969 B1 | 5/2001 | Yoseloff | |
| 6,231,442 B1 | 5/2001 | Mayeroff | |
| 6,238,288 B1 | 5/2001 | Walker et al. | |
| 6,244,957 B1 | 6/2001 | Walker et al. | |
| 6,254,483 B1 | 7/2001 | Acres | |
| 6,267,669 B1 | 7/2001 | Luciano, Jr. et al. | |
| 6,290,603 B1 | 9/2001 | Luciano, Jr. | |
| 6,319,125 B1 | 11/2001 | Acres | |
| 6,319,127 B1 | 11/2001 | Walker et al. | |
| 6,358,147 B1 | 3/2002 | Jaffe et al. | |
| 6,364,768 B1 | 4/2002 | Acres et al. | |
| 6,375,570 B1 | 4/2002 | Poole | |
| 6,394,902 B1 | 5/2002 | Glavich et al. | |
| 6,419,578 B1 | 7/2002 | Moody et al. | |
| 6,425,823 B1 | 7/2002 | Byrne | |
| RE37,885 E | 10/2002 | Acres et al. | |
| 6,468,156 B1 | 10/2002 | Hughs-Baird et al. | |
| 6,491,584 B2 | 12/2002 | Graham et al. | |
| 6,517,073 B1 | 2/2003 | Vancura | |
| 6,520,856 B1 | 2/2003 | Walker et al. | |
| 6,569,013 B1 | 5/2003 | Taylor | |
| 6,589,115 B2 | 7/2003 | Walker et al. | |
| 6,599,192 B1 | 7/2003 | Baerlocher et al. | |
| 6,607,195 B2 | 8/2003 | Vancura | |
| 6,612,927 B1 | 9/2003 | Slomiany et al. | |
| 6,634,942 B2 | 10/2003 | Walker et al. | |
| 6,695,700 B2 | 2/2004 | Walker et al. | |
| 6,702,289 B1 | 3/2004 | Feola | |
| 6,702,675 B2 | 3/2004 | Poole et al. | |
| 6,712,693 B1 | 3/2004 | Hettinger | |
| 6,726,565 B2 | 4/2004 | Hughs-Baird | |
| 6,746,016 B2 | 6/2004 | Perrie et al. | |
| 6,758,750 B2 | 7/2004 | Baerlocher et al. | |
| 6,769,986 B2 | 8/2004 | Vancura | |
| 6,786,824 B2 | 9/2004 | Cannon | |
| 6,802,778 B1 | 10/2004 | Lemay et al. | |
| 6,852,030 B2 | 2/2005 | Baerlocher et al. | |
| 6,857,957 B2 | 2/2005 | Marks et al. | |
| 6,857,959 B1 | 2/2005 | Nguyen | |
| 6,939,224 B2 | 9/2005 | Palmer et al. | |
| 6,969,317 B2 | 11/2005 | Walker et al. | |
| 7,052,395 B2 | 5/2006 | Glavich et al. | |
| 7,056,215 B1 | 6/2006 | Olive | |
| 7,115,033 B1 | 10/2006 | Timperley | |
| 7,140,964 B2 | 11/2006 | Walker et al. | |
| 7,156,739 B2 | 1/2007 | Walker et al. | |
| 7,198,569 B2 | 4/2007 | Wolf et al. | |
| 7,252,590 B2 | 8/2007 | Palmer et al. | |
| 7,258,611 B2 | 8/2007 | Bigelow, Jr. et al. | |
| RE39,817 E | 9/2007 | Walker et al. | |
| 7,291,068 B2 | 11/2007 | Bryant et al. | |
| 7,318,774 B2 | 1/2008 | Bryant et al. | |
| 7,326,115 B2 | 2/2008 | Baerlocher | |
| 7,329,179 B2 | 2/2008 | Baerlocher | |
| 7,338,370 B2 | 3/2008 | Oles et al. | |
| 7,351,146 B2 | 4/2008 | Kaminkow | |
| 7,357,714 B2 | 4/2008 | Tessmer et al. | |
| 7,361,085 B2 | 4/2008 | Packes, Jr. et al. | |
| 7,371,173 B2 | 5/2008 | Gatto et al. | |
| 7,374,486 B2 | 5/2008 | Baerlocher | |
| 7,384,334 B2 | 6/2008 | Glavich et al. | |
| 7,384,337 B2 | 6/2008 | Thomas | |
| 7,402,101 B2 | 7/2008 | Casey | |
| 7,419,429 B2 | 9/2008 | Taylor | |
| 7,427,233 B2 | 9/2008 | Walker et al. | |
| 7,452,272 B2 | 11/2008 | Walker et al. | |
| 7,465,227 B2 | 12/2008 | Baerlocher | |
| 7,465,229 B2 | 12/2008 | Shuster | |
| 7,470,185 B2 | 12/2008 | Baerlocher | |
| 7,563,167 B2 | 7/2009 | Walker et al. | |
| 7,588,496 B2 | 9/2009 | Van Asdale | |
| 7,607,978 B2 | 10/2009 | Palmer et al. | |
| 7,654,896 B2 | 2/2010 | Baerlocher | |
| 7,658,673 B2 | 2/2010 | Baerlocher et al. | |
| 7,661,678 B2 | 2/2010 | Snow | |
| 7,674,180 B2 | 3/2010 | Graham et al. | |
| 7,690,977 B2 | 4/2010 | Cuddy et al. | |
| 7,713,124 B2 | 5/2010 | Cuddy et al. | |
| 7,722,464 B2 | 5/2010 | Cuddy et al. | |
| 7,727,061 B2 | 6/2010 | Taylor | |
| 7,740,534 B2 | 6/2010 | Walker et al. | |
| 7,753,782 B2 | 7/2010 | Cuddy et al. | |
| 7,753,783 B2 | 7/2010 | Cuddy et al. | |
| 7,771,274 B2 | 8/2010 | Walker et al. | |
| 7,819,745 B2 | 10/2010 | Cuddy et al. | |
| 7,828,648 B2 | 11/2010 | Jackson | |
| 7,828,649 B2 | 11/2010 | Cuddy et al. | |
| 7,862,423 B2 | 1/2011 | Walker et al. | |
| 7,862,430 B2 | 1/2011 | Baerlocher et al. | |
| 7,967,674 B2 | 6/2011 | Baerlocher | |
| 7,993,199 B2 | 8/2011 | Iddings et al. | |
| 8,002,621 B2 | 8/2011 | Mattice et al. | |
| 8,012,009 B2 | 9/2011 | Iddings et al. | |
| 8,021,222 B2 | 9/2011 | Walker et al. | |
| 2001/0004607 A1* | 6/2001 | Olsen | 463/26 |
| 2001/0054794 A1 | 12/2001 | Cole et al. | |
| 2001/0055990 A1 | 12/2001 | Acres | |
| 2002/0058546 A2 | 5/2002 | Acres et al. | |
| 2002/0132660 A1 | 9/2002 | Taylor | |
| 2002/0147040 A1 | 10/2002 | Walker et al. | |
| 2002/0165023 A1 | 11/2002 | Brosnan et al. | |
| 2002/0193158 A1 | 12/2002 | Weiss et al. | |
| 2003/0073488 A1 | 4/2003 | Okita et al. | |
| 2003/0078101 A1 | 4/2003 | Schneider et al. | |
| 2003/0114217 A1 | 6/2003 | Walker et al. | |
| 2003/0144053 A1 | 7/2003 | Michaelson | |
| 2003/0207713 A1* | 11/2003 | Taylor | 463/25 |
| 2003/0216170 A1 | 11/2003 | Walker et al. | |
| 2004/0023713 A1 | 2/2004 | Wolf et al. | |
| 2004/0038724 A1 | 2/2004 | Asdale | |
| 2004/0048650 A1 | 3/2004 | Mierau et al. | |
| 2004/0063492 A1 | 4/2004 | Baerlocher et al. | |
| 2004/0075711 A1 | 4/2004 | Silverbrook et al. | |
| 2004/0102238 A1 | 5/2004 | Taylor | |
| 2004/0147308 A1 | 7/2004 | Walker et al. | |
| 2004/0204218 A1 | 10/2004 | Hughs-Baird | |
| 2004/0242313 A1 | 12/2004 | Munoz | |
| 2004/0248648 A1 | 12/2004 | Rothschild et al. | |
| 2005/0009597 A1 | 1/2005 | Daly | |
| 2005/0054429 A1 | 3/2005 | Baerlocher et al. | |
| 2005/0060050 A1 | 3/2005 | Baerlocher | |
| 2005/0071023 A1 | 3/2005 | Gilliland et al. | |
| 2005/0085294 A1 | 4/2005 | Walker et al. | |
| 2005/0085295 A1 | 4/2005 | Walker et al. | |
| 2005/0096121 A1 | 5/2005 | Gilliland et al. | |
| 2005/0096123 A1 | 5/2005 | Cregan et al. | |
| 2005/0143166 A1 | 6/2005 | Walker et al. | |
| 2005/0153773 A1 | 7/2005 | Nguyen et al. | |
| 2005/0202863 A1 | 9/2005 | Macaulay | |
| 2005/0208992 A1 | 9/2005 | Randall | |
| 2005/0239546 A1 | 10/2005 | Hedrick et al. | |
| 2005/0282625 A1 | 12/2005 | Nicely | |
| 2006/0025193 A1 | 2/2006 | Gail et al. | |
| 2006/0035701 A1 | 2/2006 | Walker et al. | |
| 2006/0040723 A1 | 2/2006 | Baerlocher et al. | |
| 2006/0040728 A1 | 2/2006 | Fuller | |
| 2006/0040732 A1 | 2/2006 | Baerlocher et al. | |

(56) References Cited

U.S. PATENT DOCUMENTS

| | | | | |
|---|---|---|---|---|
| 2006/0040733 | A1 | 2/2006 | Baerlocher et al. | |
| 2006/0040734 | A1 | 2/2006 | Baerlocher et al. | |
| 2006/0040736 | A1 | 2/2006 | Baerlocher et al. | |
| 2006/0046816 | A1 | 3/2006 | Walker et al. | |
| 2006/0046832 | A1 | 3/2006 | Isogai et al. | |
| 2006/0046835 | A1 | 3/2006 | Walker et al. | |
| 2006/0058095 | A1 | 3/2006 | Berman et al. | |
| 2006/0063580 | A1 | 3/2006 | Nguyen et al. | |
| 2006/0068883 | A1 | 3/2006 | Randall et al. | |
| 2006/0068903 | A1 | 3/2006 | Walker et al. | |
| 2006/0073868 | A1 | 4/2006 | Nordman | |
| 2006/0089195 | A1 | 4/2006 | Walker et al. | |
| 2006/0142077 | A1 | 6/2006 | Miles et al. | |
| 2006/0148548 | A1 | 7/2006 | Hornik et al. | |
| 2006/0172794 | A1* | 8/2006 | Walker et al. | 463/20 |
| 2006/0202415 | A1 | 9/2006 | Taylor | |
| 2006/0211489 | A1 | 9/2006 | Walker et al. | |
| 2006/0217187 | A1 | 9/2006 | Walker et al. | |
| 2006/0217188 | A1 | 9/2006 | Walker et al. | |
| 2006/0247030 | A1 | 11/2006 | Walker et al. | |
| 2006/0247031 | A1 | 11/2006 | Walker et al. | |
| 2006/0248025 | A1 | 11/2006 | Walker et al. | |
| 2006/0252512 | A1 | 11/2006 | Walker et al. | |
| 2006/0252515 | A1 | 11/2006 | Walker et al. | |
| 2006/0281541 | A1 | 12/2006 | Nguyen et al. | |
| 2006/0287071 | A1 | 12/2006 | Walker et al. | |
| 2006/0287072 | A1 | 12/2006 | Walker et al. | |
| 2007/0004508 | A1 | 1/2007 | Walker et al. | |
| 2007/0021182 | A1* | 1/2007 | Gauselmann | 463/16 |
| 2007/0054721 | A1 | 3/2007 | Jackson | |
| 2007/0054726 | A1 | 3/2007 | Muir et al. | |
| 2007/0054732 | A1 | 3/2007 | Baerlocher | |
| 2007/0060246 | A1 | 3/2007 | Baerlocher et al. | |
| 2007/0060252 | A1 | 3/2007 | Taylor | |
| 2007/0087804 | A1 | 4/2007 | Knowles et al. | |
| 2007/0087818 | A1 | 4/2007 | Walker et al. | |
| 2007/0105619 | A1 | 5/2007 | Kniesteadt et al. | |
| 2007/0117612 | A1 | 5/2007 | Walker et al. | |
| 2007/0117616 | A1 | 5/2007 | Bartholomew | |
| 2007/0135207 | A1 | 6/2007 | Tarantino | |
| 2007/0191102 | A1 | 8/2007 | Coliz et al. | |
| 2007/0213123 | A1 | 9/2007 | Walker et al. | |
| 2007/0270213 | A1 | 11/2007 | Nguyen et al. | |
| 2007/0287532 | A1 | 12/2007 | Jackson | |
| 2007/0293293 | A1 | 12/2007 | Baerlocher et al. | |
| 2007/0298857 | A1 | 12/2007 | Schlottmann et al. | |
| 2008/0020847 | A1 | 1/2008 | Kniesteadt et al. | |
| 2008/0032787 | A1 | 2/2008 | Low et al. | |
| 2008/0045344 | A1 | 2/2008 | Schlottmann et al. | |
| 2008/0064491 | A1 | 3/2008 | Taylor | |
| 2008/0064502 | A1 | 3/2008 | Schlottmann et al. | |
| 2008/0070676 | A1 | 3/2008 | Baerlocher et al. | |
| 2008/0070677 | A1 | 3/2008 | Baerlocher et al. | |
| 2008/0070678 | A1 | 3/2008 | Baerlocher et al. | |
| 2008/0070680 | A1 | 3/2008 | Baerlocher et al. | |
| 2008/0070693 | A1 | 3/2008 | Schlottmann et al. | |
| 2008/0070695 | A1* | 3/2008 | Baerlocher et al. | 463/42 |
| 2008/0076496 | A1 | 3/2008 | Baerlocher et al. | |
| 2008/0076503 | A1 | 3/2008 | Mattice et al. | |
| 2008/0076527 | A1 | 3/2008 | Low et al. | |
| 2008/0076531 | A1 | 3/2008 | Baerlocher et al. | |
| 2008/0076532 | A1 | 3/2008 | Graham et al. | |
| 2008/0076534 | A1 | 3/2008 | Iddings et al. | |
| 2008/0076542 | A1 | 3/2008 | Iddings et al. | |
| 2008/0076576 | A1 | 3/2008 | Graham et al. | |
| 2008/0081690 | A1 | 4/2008 | Baerlocher et al. | |
| 2008/0081691 | A1 | 4/2008 | Baerlocher et al. | |
| 2008/0085771 | A1 | 4/2008 | Iddings et al. | |
| 2008/0085772 | A1 | 4/2008 | Iddings et al. | |
| 2008/0102916 | A1 | 5/2008 | Kovacs et al. | |
| 2008/0102934 | A1 | 5/2008 | Tan | |
| 2008/0102935 | A1 | 5/2008 | Finnimore | |
| 2008/0108423 | A1 | 5/2008 | Benbrahim et al. | |
| 2008/0113759 | A1 | 5/2008 | Baerlocher | |
| 2008/0113771 | A1 | 5/2008 | Baerlocher et al. | |
| 2008/0113779 | A1 | 5/2008 | Cregan | |
| 2008/0113810 | A1 | 5/2008 | Kubota et al. | |
| 2008/0139274 | A1 | 6/2008 | Baerlocher | |
| 2008/0139290 | A1 | 6/2008 | Kniesteadt et al. | |
| 2008/0153564 | A1 | 6/2008 | Baerlocher et al. | |
| 2008/0167105 | A1 | 7/2008 | Kaminkow | |
| 2008/0176645 | A1 | 7/2008 | Griswold et al. | |
| 2008/0182650 | A1 | 7/2008 | Randall et al. | |
| 2008/0182655 | A1 | 7/2008 | DeWaal et al. | |
| 2008/0194316 | A1 | 8/2008 | Baerlocher | |
| 2008/0214280 | A1 | 9/2008 | Baerlocher | |
| 2008/0214292 | A1 | 9/2008 | Bryant et al. | |
| 2008/0220851 | A1 | 9/2008 | Glavich et al. | |
| 2008/0318668 | A1 | 12/2008 | Ching et al. | |
| 2009/0005151 | A1* | 1/2009 | Seelig et al. | 463/20 |
| 2009/0042652 | A1 | 2/2009 | Baerlocher et al. | |
| 2009/0088239 | A1* | 4/2009 | Iddings et al. | 463/20 |
| 2009/0088252 | A1 | 4/2009 | Nicely et al. | |
| 2009/0124316 | A1 | 5/2009 | Baerlocher et al. | |
| 2009/0181758 | A1 | 7/2009 | Loose et al. | |
| 2010/0120506 | A1 | 5/2010 | Davis et al. | |
| 2010/0124970 | A1 | 5/2010 | Pawloski et al. | |
| 2010/0144415 | A1 | 6/2010 | Wolf et al. | |
| 2010/0160031 | A1 | 6/2010 | Gilliland et al. | |
| 2010/0210338 | A1 | 8/2010 | Taylor | |
| 2010/0227678 | A1 | 9/2010 | Konishi et al. | |
| 2010/0267446 | A1* | 10/2010 | Pacey | 463/25 |
| 2011/0034236 | A1 | 2/2011 | Jackson | |
| 2011/0105216 | A1 | 5/2011 | Cohen et al. | |
| 2011/0111826 | A1 | 5/2011 | Baerlocher et al. | |
| 2011/0111864 | A1* | 5/2011 | Englman et al. | 463/42 |
| 2011/0118004 | A1 | 5/2011 | Kelly et al. | |
| 2011/0118010 | A1 | 5/2011 | Brune | |

FOREIGN PATENT DOCUMENTS

| | | | |
|---|---|---|---|
| EP | 0 753 331 | A2 | 1/1997 |
| EP | 0 874 337 | A1 | 10/1998 |
| EP | 0 945 837 | A2 | 3/1999 |
| EP | 1 004 970 | A2 | 5/2000 |
| EP | 1 076 321 | A1 | 2/2001 |
| EP | 1 195 730 | A2 | 4/2002 |
| EP | 1 378 873 | A2 | 1/2004 |
| EP | 1 513 114 | A2 | 3/2005 |
| GB | 2 137 392 | A | 10/1984 |
| GB | 2 292 245 | A | 2/1996 |
| GB | 2 322 217 | A | 8/1998 |
| GB | 2 382 911 | A | 6/2003 |
| GB | 2 387 950 | A | 10/2003 |
| WO | WO 85/00910 | A1 | 2/1985 |
| WO | WO 98/35309 | A1 | 8/1998 |
| WO | WO 99/41718 | A1 | 8/1999 |
| WO | WO 99/65579 | A1 | 12/1999 |
| WO | WO 00/25281 | A1 | 5/2000 |
| WO | WO 01/61437 | A2 | 8/2001 |
| WO | WO 03/026757 | A1 | 4/2003 |
| WO | WO 03/045515 | A1 | 6/2003 |
| WO | WO 03/045516 | A1 | 6/2003 |
| WO | WO 2004/004855 | A1 | 1/2004 |
| WO | WO 2004/103495 | A1 | 12/2004 |
| WO | WO 2005/010831 | A2 | 3/2005 |
| WO | WO 2005/028056 | A1 | 3/2005 |
| WO | WO 2005/029220 | A2 | 3/2005 |
| WO | WO 2005/033825 | A2 | 4/2005 |
| WO | WO 2005/033826 | A2 | 4/2005 |
| WO | WO 2005/083599 | A1 | 9/2005 |
| WO | WO 2005/120672 | A1 | 12/2005 |
| WO | WO 2006/002241 | A2 | 1/2006 |
| WO | WO 2006/004831 | A2 | 1/2006 |
| WO | WO 2006/015442 | A2 | 2/2006 |
| WO | WO 2006/017036 | A1 | 2/2006 |
| WO | WO 2006/017431 | A2 | 2/2006 |
| WO | WO 2006/027677 | A2 | 3/2006 |
| WO | WO 2006/039067 | A2 | 4/2006 |
| WO | WO 2007/090270 | A1 | 8/2007 |
| WO | WO 2008/057325 | A2 | 5/2008 |

* cited by examiner

FIG. 3

| Cool Machine Scatter Paytable | | Symbol Position, and probability of scatter symbol occurring in each position | | | | | | | | | | | | | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| Number of Scatters Hit | Payout | 0.04 | 0.04 | 0.04 | 0.04 | 0.04 | 0.04 | 0.04 | 0.04 | 0.04 | 0.04 | 0.04 | 0.04 | 0.04 | 0.04 | 0.04 |
| 0 | 0 | 0.542086 | 0.564673 | 0.588201 | 0.61271 | 0.638239 | 0.664833 | 0.692534 | 0.72139 | 0.751447 | 0.782758 | 0.815373 | 0.849347 | 0.884736 | 0.9216 | 0.96 |
| 1 | 0 | 0.338804 | 0.329393 | 0.318609 | 0.306355 | 0.292526 | 0.277014 | 0.2597 | 0.240463 | 0.219172 | 0.195689 | 0.169869 | 0.141558 | 0.110592 | 0.0768 | 0.04 |
| 2 | 0 | 0.098818 | 0.089211 | 0.079652 | 0.070206 | 0.060943 | 0.05194 | 0.043283 | 0.035068 | 0.027397 | 0.020384 | 0.014156 | 0.008847 | 0.004608 | 0.0016 | |
| 3 | 40 | 0.017842 | 0.014868 | 0.012169 | 0.009751 | 0.007618 | 0.005771 | 0.004208 | 0.002922 | 0.001903 | 0.001132 | 0.00059 | 0.000246 | 0.000064 | | |
| 4 | 100 | 0.00223 | 0.001704 | 0.001268 | 0.000914 | 0.000635 | 0.000421 | 0.000263 | 0.000152 | 7.93E-05 | 3.54E-05 | 1.23E-05 | 2.56E-06 | | | |
| 5 | 500 | 0.000204 | 0.000142 | 9.51E-05 | 6.09E-05 | 3.7E-05 | 2.1E-05 | 1.1E-05 | 5.07E-06 | 1.98E-06 | 5.9E-07 | 1.02E-07 | | | | |
| 6 | 1000 | 1.42E-05 | 8.87E-06 | 5.28E-06 | 2.96E-06 | 1.54E-06 | 7.31E-07 | 3.04E-07 | 1.06E-07 | 2.75E-08 | 4.1E-09 | | | | | |
| 7 | 5000 | 7.61E-07 | 4.23E-07 | 2.2E-07 | 1.06E-07 | 4.59E-08 | 1.74E-08 | 5.44E-09 | 1.26E-09 | 1.64E-10 | | | | | | |
| 8 | 10000 | 3.17E-08 | 1.54E-08 | 6.88E-09 | 2.76E-09 | 9.57E-10 | 2.72E-10 | 5.66E-11 | 6.55E-12 | | | | | | | |
| 9 | 10000 | 1.03E-09 | 4.28E-10 | 1.59E-10 | 5.1E-11 | 1.33E-11 | 2.52E-12 | 2.62E-13 | | | | | | | | |
| 10 | 10000 | 2.57E-11 | 8.91E-12 | 2.65E-12 | 6.38E-13 | 1.11E-13 | 1.05E-14 | | | | | | | | | |
| 11 | 10000 | 4.86E-13 | 1.35E-13 | 3.02E-14 | 4.83E-15 | 4.19E-16 | | | | | | | | | | |
| 12 | 10000 | 6.75E-15 | 1.41E-15 | 2.09E-16 | 1.68E-17 | | | | | | | | | | | |
| 13 | 10000 | 6.49E-17 | 9.02E-18 | 6.71E-19 | | | | | | | | | | | | |
| 14 | 10000 | 3.87E-19 | 3.87E-19 | | | | | | | | | | | | | |
| 15 | 10000 | 1.07E-21 | | | | | | | | | | | | | | |
| | Avg. Win | 1.057 | | | | | | | | | | | | | | |

FIG. 4

| Cool Machine Scatter Paytable | | Symbol Position, and probability of scatter symbol occurring in each position | | | | | | | | | | | | | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| Number of Scatters Hit | Payout | 0.06 | 0.06 | 0.06 | 0.06 | 0.06 | 0.06 | 0.06 | 0.06 | 0.06 | 0.06 | 0.06 | 0.06 | 0.06 | 0.06 | 0.06 |
| 0 | 0 | 0.395292 | 0.420523 | 0.447365 | 0.47592 | 0.506298 | 0.538615 | 0.572995 | 0.609569 | 0.648478 | 0.68987 | 0.733904 | 0.780749 | 0.830584 | 0.8836 | 0.94 |
| 1 | 0 | 0.378471 | 0.375787 | 0.371218 | 0.364535 | 0.355486 | 0.343797 | 0.329167 | 0.311269 | 0.289745 | 0.264205 | 0.234225 | 0.19934 | 0.159048 | 0.1128 | 0.06 |
| 2 | 0 | 0.169104 | 0.155911 | 0.142169 | 0.127975 | 0.113453 | 0.09875 | 0.084043 | 0.069539 | 0.055483 | 0.04216 | 0.029901 | 0.019086 | 0.010152 | 0.0036 | |
| 3 | 40 | 0.046773 | 0.039807 | 0.033273 | 0.027229 | 0.021725 | 0.016809 | 0.012517 | 0.008877 | 0.005902 | 0.003588 | 0.001909 | 0.000812 | 0.000216 | | |
| 4 | 100 | 0.008957 | 0.006987 | 0.00531 | 0.003911 | 0.002773 | 0.001878 | 0.001198 | 0.000708 | 0.000377 | 0.000172 | 6.09E-05 | 1.3E-05 | | | |
| 5 | 500 | 0.001258 | 0.000892 | 0.00061 | 0.000399 | 0.000248 | 0.000144 | 7.65E-05 | 3.62E-05 | 1.44E-05 | 4.39E-06 | 7.78E-07 | | | | |
| 6 | 1000 | 0.000134 | 8.54E-05 | 5.19E-05 | 2.97E-05 | 1.58E-05 | 7.65E-06 | 3.26E-06 | 1.15E-06 | 3.07E-07 | 4.67E-08 | | | | | |
| 7 | 5000 | 1.1E-05 | 6.23E-06 | 3.31E-06 | 1.63E-06 | 7.21E-07 | 2.79E-07 | 8.9E-08 | 2.11E-08 | 2.8E-09 | | | | | | |
| 8 | 10000 | 7.01E-07 | 3.48E-07 | 1.59E-07 | 6.49E-08 | 2.3E-08 | 6.68E-09 | 1.42E-09 | 1.68E-10 | | | | | | | |
| 9 | 10000 | 3.48E-08 | 1.48E-08 | 5.63E-09 | 1.84E-09 | 4.9E-10 | 9.47E-11 | 1.01E-11 | | | | | | | | |
| 10 | 10000 | 1.33E-09 | 4.73E-10 | 1.44E-10 | 3.53E-11 | 6.25E-12 | 6.05E-13 | | | | | | | | | |
| 11 | 10000 | 3.87E-11 | 1.1E-11 | 2.5E-12 | 4.09E-13 | 3.63E-14 | | | | | | | | | | |
| 12 | 10000 | 8.23E-13 | 1.75E-13 | 2.66E-14 | 2.18E-15 | | | | | | | | | | | |
| 13 | 10000 | 1.21E-14 | 1.72E-15 | 1.31E-16 | | | | | | | | | | | | |
| 14 | 10000 | 1.1E-16 | 7.84E-18 | | | | | | | | | | | | | |
| 15 | 10000 | 4.7E-19 | | | | | | | | | | | | | | |
| | Avg. Win | 3.592 | | | | | | | | | | | | | | |

GAMING MACHINES HAVING NORMAL AND HOT MODES

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machine manufacturers strive to make wagering gaming machines that provide as much enjoyment, entertainment, and excitement as possible for players. Providing interesting and exciting primary wagering games and secondary games in which a player has an opportunity to win potentially large awards is one way to enhance player enjoyment and excitement. Various known wagering gaming machines use devices such as reels or wheels to enhance the attraction of the wagering gaming machines to players and to enhance the overall gaming experience of players.

Wagering gaming machines are typically set to pay back, on average, a certain percentage of the amount of money wagered by players. The average percentage of money wagered that is paid back to the player as an award is sometimes called the average expected payback or average expected payback percentage. The average expected payback percentage provided by a wagering gaming machine is in part determined by the paytable employed by the wagering gaming machine and in part determined by the likelihood that each designated winning symbol combination included in the paytable will occur in each play of the wagering game. A paytable typically determines the awards that a player wins if the designated winning symbols or designated winning symbol combinations occur during play of the wagering game. For example, in a slot game, a paytable determines the award that will be provided to a player if certain winning symbols or winning symbol combinations appear on an activated payline. If the wagering gaming machine has one or more secondary games, the average expected payback percentage provided by the wagering gaming machine is typically also determined by the likelihood of each of the secondary games occurring for each play of the wagering game and based on the average expected award resulting from play of the each of the secondary games.

At any one point in time, a typical wagering gaming machine is set to have a static or predetermined average expected payback percentage. That is, for each play of the wagering game at a designated wager level or amount, the average expected payback percentage is the same. This average expected payback percentage is either set by the gaming machine manufacturer based on the request of a casino or set by the casino itself. Certain gaming machine manufacturers provide sets of different games of the same type that have different average expected payback percentages. This enables the casino, at different times, to set the desired average expected payback percentage for the wagering gaming machine.

Certain players believe that wagering gaming machines become “hot” at various times. However, typical wagering gaming machines (such as Class III wagering gaming machines) do not vary the average expected payback percentage for each play of the wagering game.

Gaming machine manufacturers constantly strive to make new gaming machines that provide as much enjoyment and excitement as possible, and to increase player excitement and enjoyment.

SUMMARY

Various embodiments of the present disclosure provide an electronic gaming machine having: (a) a first, default, cool, or base mode in which the electronic gaming machine provides a first, default, cool, or base average expected payback percentage for each play of a wagering game; and (b) a different second, enhanced, or hot mode in which the electronic gaming machine provides a greater or increased average expected payback percentage (relative to the first, default, cool, or base average expected payback percentage) for each play of that wagering game. The electronic gaming machine of the present disclosure is in the base mode for certain periods of play and is in the hot mode for certain periods of play. After a determination is made that the electronic gaming machine will be in the hot mode, the electronic gaming machine functions in the hot mode and provides the increased average expected payback percentage for each play of the wagering game during a designated period.

In certain embodiments, players are not at all informed that any specific electronic gaming machine is in a hot mode. In other embodiments, players are generally provided information that one or more electronic gaming machines are in a hot mode, without specifying which electronic gaming machines are in the hot mode.

In various embodiments, the point in time at which the determination of whether an electronic gaming machine will go into the hot mode is made is randomly determined. In other embodiments, the determination of whether an electronic gaming machine will go into the hot mode is made at predetermined intervals or according to a predetermined schedule.

In certain embodiments, the determination made as to whether the electronic gaming machine will be in the hot mode is a random determination.

In various embodiments, the designated period for which the electronic gaming machine will remain in the hot mode is determined randomly. In other embodiments, the designated period is predetermined. In certain embodiments, the electronic gaming machine will be in the base mode for the majority of or relatively longer periods of play and in the hot mode for a minority of or relatively shorter periods of play.

Additional features and advantages are described herein, and will be apparent from, the following Detailed Description and the Figures.

BRIEF DESCRIPTION OF THE FIGURES

FIG. 3 illustrates an example of an normal scatter paytable for an electronic gaming machine of the present disclosure.

FIG. 4 illustrates an example of an hot mode scatter paytable for an electronic gaming machine of the present disclosure.

DETAILED DESCRIPTION

Figure 1:
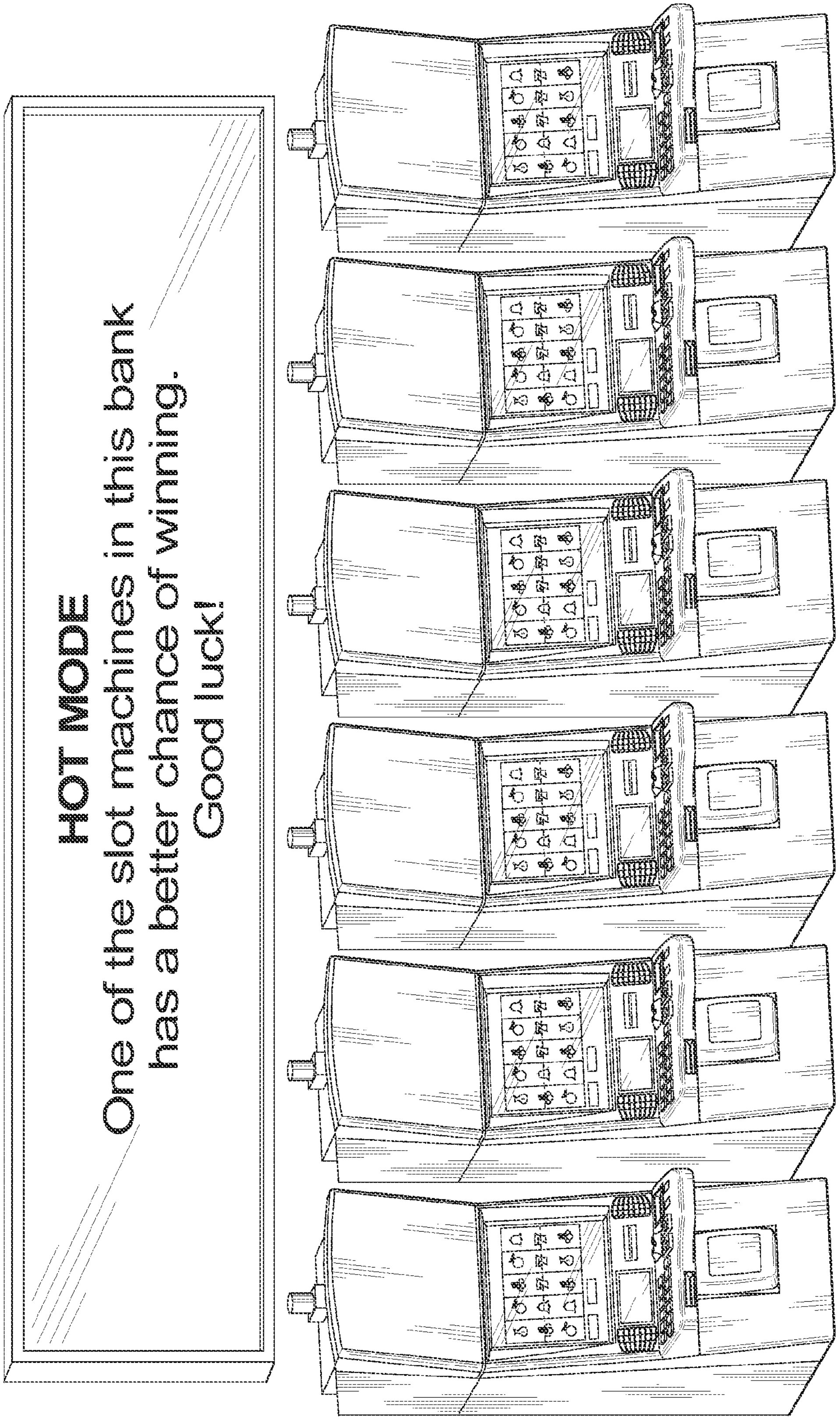
FIG. 1 is a perspective view of a group or bank of six electronic gaming machines and a display device displaying a notification that one of the electronic gaming machines in the group or bank is in the hot mode without informing the players which of the specific electronic gaming machines is actually in the hot mode.

Electronic Gaming Machines Having Normal and Hot Modes

Various embodiments of the present disclosure provide an electronic gaming machine having: (a) a first, default, cool, or base mode in which the electronic gaming machine provides a first, default, cool, or base average expected payback percentage for each play of a wagering game; and (b) a different second, enhanced, or hot mode in which the electronic gaming machine provides a greater or increased average expected payback percentage (relative to the first, default, cool, or base average expected payback percentage) for each play of that wagering game. The first, default, cool, or base mode is generally referred to herein as the default mode or the base mode, and the second, enhanced, or hot mode is referred to herein as the enhanced mode or the hot mode. The example electronic gaming machine or machines of the present disclosure are sometimes referred to herein for brevity as an EGM or EGMs. The EGM of the present disclosure is in the base mode for certain periods of play and is in the hot mode for certain periods of play. After a determination is made that the EGM will be in the hot mode, the EGM functions in the hot mode and provides the increased average expected payback percentage for each play of the wagering game during a designated period. In certain embodiments, the EGM will be in the base mode for the majority of or relatively longer periods of play and in the hot mode for a minority of or relatively shorter periods of play. In certain embodiments, the determination made as to whether the EGM will be in the hot mode is a random determination, as further discussed below. In various embodiments, players are not informed that a specific EGM is in the hot mode, as also further discussed below.

More specifically, the present disclosure contemplates that the hot mode can be selectively employed: (a) in a standalone EGM; (b) in one or more EGMs in a relatively small group of EGMs, such as a bank of EGMs; or (c) one or more EGMs in a relatively large group of EGMs, such as all of the EGMs in a casino.

The present disclosure contemplates that, in different embodiments, for each EGM: (a) that EGM itself will determine if, when, and for how long that EGM will be in the hot mode; (b) a central controller or server associated with that EGM will determine if, when, and for how long that EGM will be in the hot mode, and will send the appropriate communications to that EGM to cause that EGM to be in the hot mode; or (c) both the EGM and the central controller or server will share or jointly make these determinations. It should be appreciated that the determinations of if, when, and for how long an EGM will be in the hot mode can be divided between the EGM and the central controller or server in a variety of different manners. The present disclosure contemplates that these determinations of if, when, and for how long an EGM will be in the hot mode can made in any one of variety of different suitable manners as further discussed below. It should also be appreciated that: (a) if, when, and for how long an EGM will be in the hot mode may be completely independent of if, when, and for how long any other EGM will be in the hot mode; or (b) if, when, and for how long an EGM will be in the hot mode may be partly or fully dependent on if, when, and for how long one or more other EGMs will be in the hot mode.

In one example embodiment wherein a standalone EGM itself determines whether that EGM will be in the hot mode, the determination of whether that EGM will be in the hot mode is made independent of any determination of whether any other EGM is or will be in the hot mode. In other embodiments, the determination of whether an EGM will be in the hot mode is partially or wholly dependent on: (a) whether one or more other EGMs are or will be in the hot mode; and/or (b) for how long one or more other EGMs are or will be in the hot mode. In certain embodiments wherein a group of EGMs each employ this feature, the determination of whether each EGM will be in the hot mode can be: (a) independent of any determination of whether one or more of the other EGMs in the group are or will be in the hot mode; or (b) dependent on whether one or more of the other EGMs in the group are or will be in the hot mode.

In various embodiments wherein each EGM in a group of EGMs can enter the hot mode, a central controller or server will separately control whether each EGM in the group of EGMs will enter the hot mode. In certain of these embodiments, the number of EGMs in the group of EGMs that can be in the hot mode at any one point in time or during a designated period is unlimited. In other of these embodiments, the number of EGMs in the group of EGMs that can be in the hot mode at any one point in time or during a designated period is limited to a designated quantity of fewer than all of the EGMs in the group.

The present disclosure contemplates that the point in time at which the determination of whether an EGM will go into the hot mode is made can be determined in any one of a variety of different manners. For example, in an embodiment wherein a standalone EGM itself determines whether that EGM will be in the hot mode, the EGM determines the point in time at which it makes the hot mode determination in any of a variety of different manners. In certain embodiments, the point in time at which the determination of whether an EGM will go into the hot mode is made is randomly determined. In other embodiments, the determination of whether an EGM will go into the hot mode is made at regular intervals, such every ten seconds, every minute, every five minutes, every fifteen minutes, every half hour, every hour, or every day. In certain embodiments, the point in time at which the determination of whether an EGM will go into the hot mode is made is determined based on an occurrence of a designated triggering event, which may be one or more of a variety of different triggering events.

In various other embodiments, the point in time at which the determination of whether an EGM will go into the hot mode is made is at least partially determined based on one or more of: (a) amounts of wagers placed by one or more players; (b) a quantity of plays of any wagering games played by one or more players; (c) a length of time that one or more players have played any wagering games; (d) an amount of credits won by one or more players; (e) an amount of credits lost by one or more players; (f) a quantity of winning outcomes achieved by one or more players; (g) whether a jackpot or progressive award has been won; (h) whether the EGM is entering an attract mode; (i) a quantity of times the EGM has entered the attract mode; (j) whether a designated wagering game has been enabled or disabled on the EGM by an operator of the EGM; (k) player cash-in to the EGM; (l) player cash-out from the EGM; (m) player removal of a player identification card from the EGM; (n) whether one or more players have encountered a certain percentage loss over a period of time; (o) whether one or more players have encountered a certain percentage win over a period of time; (p) a quantity of plays since the jackpot or progressive award was won; (q) a total amount of cash-in for the EGM meeting a designated threshold; (r) a total amount of cash-out for the EGM meeting a designated threshold; (s) a total amount of cash-in for the establishment in which the EGM is located meeting a designated threshold; and (t) a total amount of cash-out for the establishment in which the EGM is located meeting a designated threshold.

The present disclosure contemplates that after it has been determined to determine whether an EGM will go into the hot mode, the actual determination of whether that EGM will go into the hot mode can be made in a variety of different manners. In certain embodiments, at least one determination of whether an EGM will go into the hot mode is partly or wholly based on one or more random determinations. In certain of these embodiments, one or more of the random determinations are not based on other factors, such as any pools or wagers. In other embodiments, the determination of whether an EGM will go into the hot mode is at least partially based on one or more other factors, such as: (a) amounts of wagers placed by one or more players; (b) a quantity of plays of any wagering games played by one or more players; (c) a length of time that one or more players have played any wagering games; (d) an amount of credits won by one or more players; (e) an amount of credits lost by one or more players; (f) a quantity of winning outcomes achieved by one or more players; (g) whether a jackpot or progressive award has been won; (h) whether the EGM is entering an attract mode; (i) a quantity of times the EGM has entered the attract mode; (j) whether a designated wagering game has been enabled or disabled on the EGM by an operator of the EGM; (k) player cash-in to the EGM; (l) player cash-out from the EGM; (m) player removal of a player identification card from the EGM; (n) whether one or more players have encountered a certain percentage loss over a period of time; (o) whether one or more players have encountered a certain percentage win over a period of time; (p) a quantity of plays since the jackpot or progressive award was won; (q) a total amount of cash-in for the EGM meeting a designated threshold; (r) a total amount of cash-out for the EGM meeting a designated threshold; (s) a total amount of cash-in for the establishment in which the EGM is located meeting a designated threshold; and (t) a total amount of cash-out for the establishment in which the EGM is located meeting a designated threshold.

In certain other embodiments, the determination of whether an EGM will go into the hot mode is determined using one or more of the methods described in U.S. Patent Application Publication No. 2010/0081497.

The present disclosure further contemplates that the designated period that an EGM will be the hot mode can be determined in a variety of different manners. In one embodiment, the designated period that an EGM will be in the hot mode is a predetermined or predefined static period. In other embodiments, the designated period that an EGM will be in the hot mode is based on a randomly determined schedule or on a predetermined schedule (such as longer periods in each subsequent hour during the day). In certain other embodiments, the designated period that an EGM will be in the hot mode is a randomly determined period.

The present disclosure contemplates that the designated period that an EGM will be in the hot mode can be a variety of different suitable periods. The present disclosure contemplates that the length of the designated period that an EGM will be in the hot mode can be measured by an amount of time, a quantity of plays of one or more games, results of plays of one or more games, or any other suitable measurement. Thus, for example, the designated period that an EGM will be in the hot mode: (a) can be a designated quantity of plays of a wagering game or other game, such as ten plays; (b) can be a designated period of time, such as one minute; (c) can last until one or more designated terminating event(s) occur(s), such as the generation of a termination symbol or termination symbol combination; (d) can last until a designated amount, such as a designated amount of credits, is won; (e) can last until a designated amount, such as a designated amount of credits, is lost; (f) can last until a certain number of winning outcomes, such as ten winning outcomes, occur; (g) can last until a highest award, such as a jackpot award, is provided; (h) can last until one of a plurality of different triggering events occur, such as until either the player plays 100 plays of the primary game during the hot mode or the player receives a jackpot award during the hot mode; and (i) can last until a triggering event used to determine whether an EGM should enter the hot mode occurs.

In various other embodiments, the designated period is at least partially determined based on one or more of: (a) amounts of wagers placed by one or more players; (b) a quantity of plays of any wagering games played by one or more players; (c) a length of time that one or more players have played any wagering games; (d) an amount of credits won by one or more players; (e) an amount of credits lost by one or more players; (f) a quantity of winning outcomes achieved by one or more players; (g) whether a jackpot or progressive award has been won; (h) whether the EGM is entering an attract mode; (i) a quantity of times the EGM has entered the attract mode; (j) whether a designated wagering game has been enabled or disabled on the EGM by an operator of the EGM; (k) player cash-in to the EGM; (l) player cash-out from the EGM; (m) player removal of a player identification card from the EGM; (n) whether one or more players have encountered a certain percentage loss over a period of time; (o) whether one or more players have encountered a certain percentage win over a period of time; (p) a quantity of plays since the jackpot or progressive award was won; (q) a total amount of cash-in for the EGM meeting a designated threshold; (r) a total amount of cash-out for the EGM meeting a designated threshold; (s) a total amount of cash-in for the establishment in which the EGM is located meeting a designated threshold; and (t) a total amount of cash-out for the establishment in which the EGM is located meeting a designated threshold The present disclosure also contemplates that two or more designated periods that an EGM will be in the hot mode can be of the same length or of varying lengths. For example, an EGM may be in the hot mode a first time for a first length of time and in the hot mode a second different time for a second different length of time. In another example, a first EGM may be in the hot mode for a first length of time, and a second different EGM may be in the hot mode for a second different length of time. The lengths can be predetermined, randomly determined, or determined in any other suitable manner. It should be appreciated that varying the length of the designated periods that an EGM is in the hot modes makes it more difficult for players to figure out that: (a) an EGM is in the hot mode, (b) which specific EGM is in the hot mode, and (c) for how long an EGM will be in or remain in the hot mode.

The present disclosure contemplates that an EGM can include more than one or a plurality of different hot modes. These different hot modes can be different in one or more different ways or manners. For example, different hot modes can have: (a) different average expected payback percentages; (b) the same average expected payback percentages, but different award values; (c) different quantities of bonus games that can be triggered in the hot mode; (d) different types of bonus games that can be triggered in the hot mode; (e) different numbers of bonus entries or bonus plays; (f) different scatter-pay combinations; (g) different buy-a-pay combinations; (h) different wager amounts that, when placed by a player, enable scatter-pays; (i) different average bonus awards for play of a bonus game; and (j) different frequencies of entering a bonus game. In embodiments in which an EGM includes a plurality of hot modes, which of the hot modes the EGM implements may be determined in any suitable manner, such as randomly, based on a predetermined sequence or pattern, based on one or more wagers by one or more places, and based on one or more different triggering events. It should be appreciated that in various embodiments in which the EGM includes a plurality of hot modes, the EGM may implement zero, one, a plurality but less than all, or all of the hot modes at any given time. That is, one of these EGMs may implement multiple different hot modes simultaneously.

Since certain of these differences between hot modes may enable a player to determine that an EGM is in a hot mode (as described further below), it should be appreciated that certain of these differences between hot modes are not employed in various embodiments. In other embodiments, these differences between hot modes are so slight or small that a player would be unlikely to determine that an EGM is in a hot mode. Thus, in these embodiments, certain of these differences between hot modes are employed, even though there is a slight chance that the player may be able to determine that an EGM is in a hot mode.

The present disclosure also contemplates that different EGMs could have different hot modes. For example, one EGM can have a hot mode that provides a first enhanced average expected payback percentage, and another EGM can have a hot mode that provides a second different higher enhanced average expected payback percentage.

It should be appreciated that the greater or increased average expected payback percentage in the hot mode may be any suitable average expected payback percentage that is greater than the average expected payback percentage of the normal or default mode. In one example, the default average expected payback percentage in the default mode is 88%, while the greater or increased average expected payback percentage in the hot mode is 90%. In another example, the default average expected payback percentage in the default mode is 90%, while the greater or increased average expected payback percentage in the hot mode is 98%. In another example, the default average expected payback percentage in the default mode is 94%, while the greater or increased average expected payback percentage in the hot mode is 102%. That is, in some embodiments, the greater or increased average expected payback percentage in the hot mode is greater than 100%.

The present disclosure contemplates that, in most embodiments, an EGM that is in the hot mode and all player viewable display devices associated with that EGM will not directly inform players that that specific EGM is in the hot mode. It should be appreciated that if a specific EGM or associated display device informed players that that specific EGM is in (or is about to be in) the hot mode, many players would only play that EGM when it is in the hot mode. The present disclosure further contemplates that, in certain embodiments, display devices viewable only by casino personnel, such as security personnel in casino floor monitoring or security areas not accessible by players, may display to those security or monitoring personnel that an EGM is currently in the hot mode or about to be in the hot mode. This enables such casino security or monitoring personnel to monitor such EGMs closely when they are in the hot mode. This would also help such security or monitoring personnel to understand why a player is winning at a higher than expected level. In certain embodiments, in the instances in which an EGM itself determines whether or not that EGM will be in the hot mode, the EGM would send a communication to a designated security server or controller to inform the security server or controller that that EGM will be in the hot mode for a designated period. In certain embodiments, in the instances in which a server determines whether an EGM will be in the hot mode, the server would send a communication to a designated security server or controller to inform the designated security server or controller that that EGM will be in the hot mode for a designated period.

While, in most embodiments disclosed herein, a player will generally not be informed when an EGM the player is playing is in the hot mode, it should be appreciated that, in certain instances, a player may figure out or guess that the EGM the player is playing is in the hot mode because the player is winning more than usual. In other words, the EGM can be considered to be indirectly informing the player that the EGM the player is playing is in the hot mode due to the more than typical number or quantity of wins or the higher winning amounts or awards provided to the player. This in part depends on how familiar the player is with the EGM as well as the amount of the increase of the average expected payout percentage when the EGM is in the hot mode. The present disclosure contemplates that this potential indirect information to the player can be reduced by varying the times at which it is determined whether an EGM goes into the hot mode, the likelihood that the EGM goes into the hot mode at those times, and the designated period the EGM stays in the hot mode.

In certain embodiments, the present disclosure contemplates informing the player that the EGM the player is playing is in the hot mode, but not telling the player when the hot mode will end (i.e., not informing the player of the designated period in which the EGM will be in the hot mode). In other embodiments, the present disclosure contemplates informing the player that the EGM will be in the hot mode for a subset of time during a set of time or a limited period during a designated period (such as for two minutes of the next twenty minutes).

In various embodiments, the present disclosure contemplates informing the player that the EGM the player is playing is in the hot mode and when the hot mode will end. For example, in one embodiment, at extremely infrequent, random times, a casino or other gaming establishment will cause all of the EGMs to enter the hot mode, which would cause mass play on the EGMs. Because these instances occur so infrequently, notifying players that the EGMs are in the hot mode would not cause players to only play the EGMs when they are in the hot mode. That is, players would not wait for these extremely rare events to occur before playing the EGMs. Thus, in these instances, the casino or gaming establishment may notify players that the EGMs are in the hot mode and, in certain embodiments, when the hot mode will end, since such notifications will not cause a drop in EGM play.

In certain embodiments, a player is provided with information regarding the hot mode status of an EGM or group of EGMs based on the player's status level in a player tracking system. In one embodiment, players with relatively higher player status levels are provided with more information regarding the hot mode status of one or more EGMs than players with relatively lower player status levels. In one example of this embodiment, a player tracking system includes three player status levels: Silver, Gold, and Platinum. Here, players are provided information of varying specificity regarding which EGMs in a casino are in the hot mode based on their player status levels. In this example: (a) players having the Silver player status level are provided with the least specific information, such as the quantity of EGMs in the casino that are in the hot mode; (b) players having the Gold player status level are provided with more specific information, such as the quantity of EGMs in the casino that are in the hot mode and the general location of those EGMs; and (c) players having the Platinum player status level are provided with the most specific information, such as the quantity of EGMs in the casino that are in the hot mode, the general location of those EGMs, and the specific bank or banks of EGMs in that general location that include the EGMs in the hot mode. It should be appreciated that any suitable information regarding the hot mode status of one or more EGMs may be provided, and that the information may be provided in any suitable manner. It should be appreciated that any suitable set of players may be provided with such information.

As generally illustrated in FIG. 1, the present disclosure contemplates that, in certain embodiments, a display device associated with a group of EGMs, such as the bank of six EGMs shown in FIG. 1, will inform players that one or a plurality (but not all) of the EGMs in the group are in the hot mode without informing the players which of the specific EGMs is or are actually in the hot mode. Thus, the players will not know which specific EGM or EGMs in the group are in the hot mode.

Figure 2:
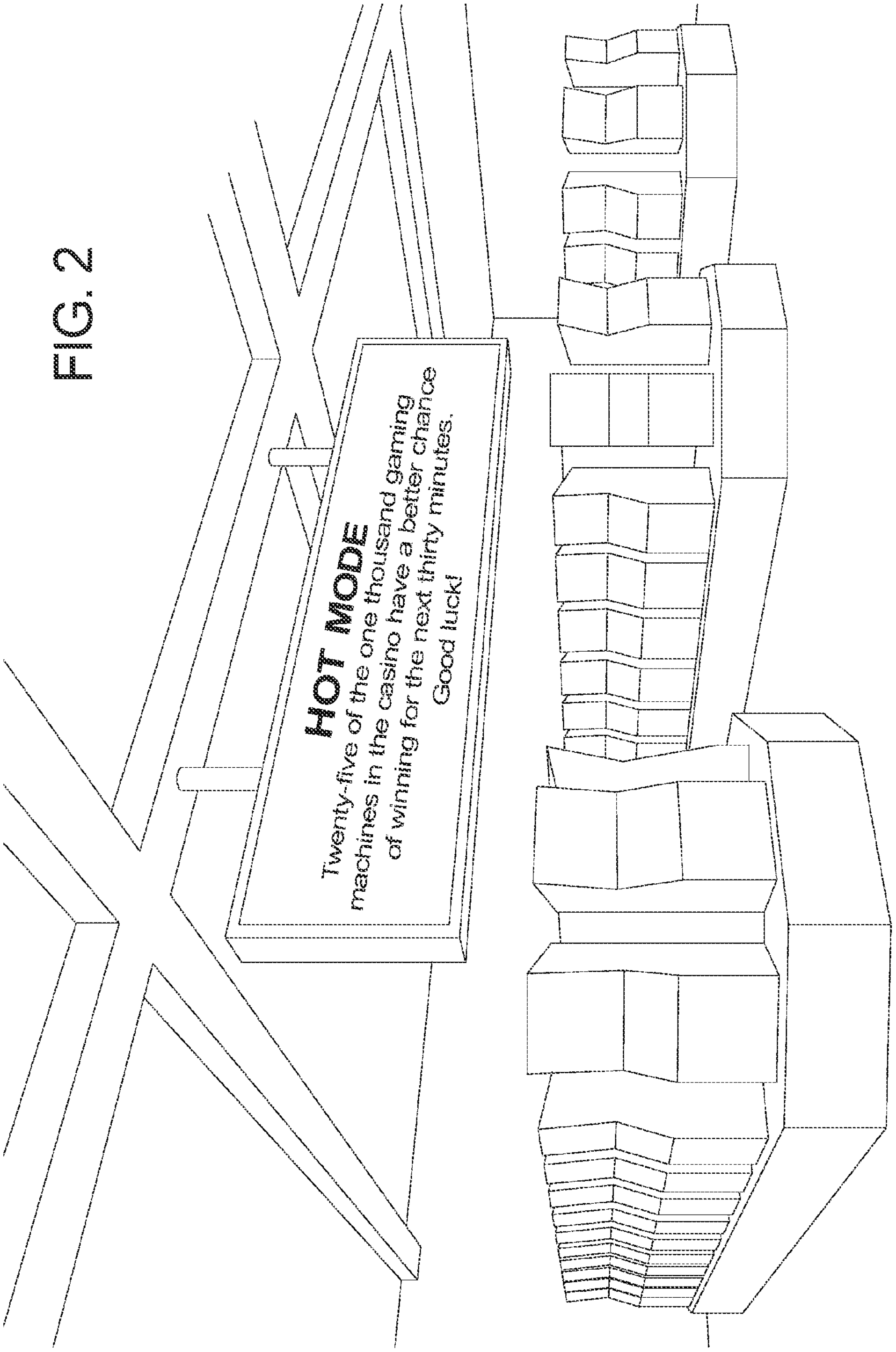
FIG. 2 is a perspective view of a casino floor including a relatively large quantity of electronic gaming machines and a display device displaying a notification that twenty-five of the one thousand electronic gaming machines on the casino floor are in the hot mode or will be in the hot mode for the next thirty minutes.
Figure 5A:
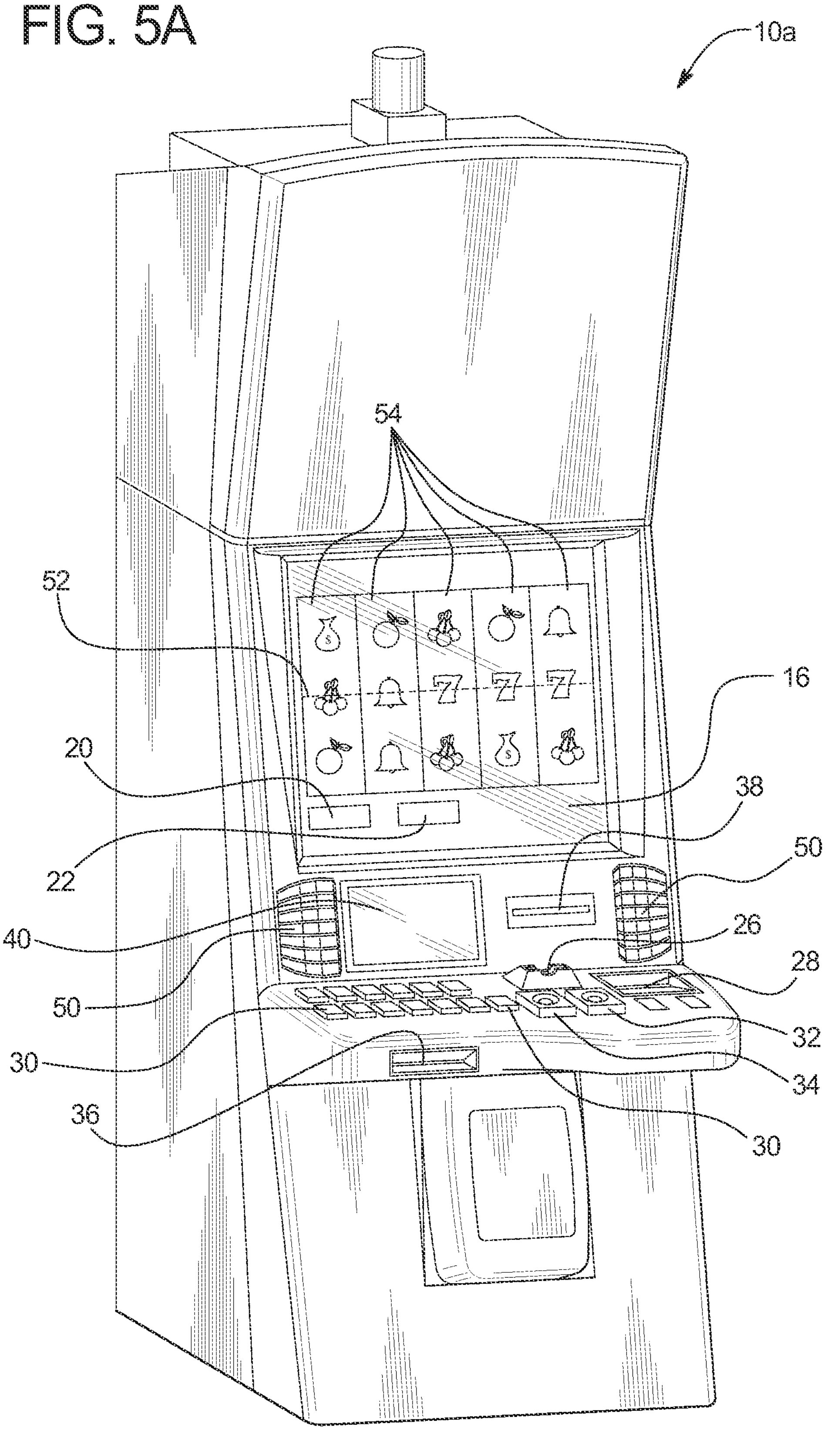
FIGS. 5A and 5B are perspective views of example alternative embodiments of an electronic gaming machine of the present disclosure.
Figure 5B:
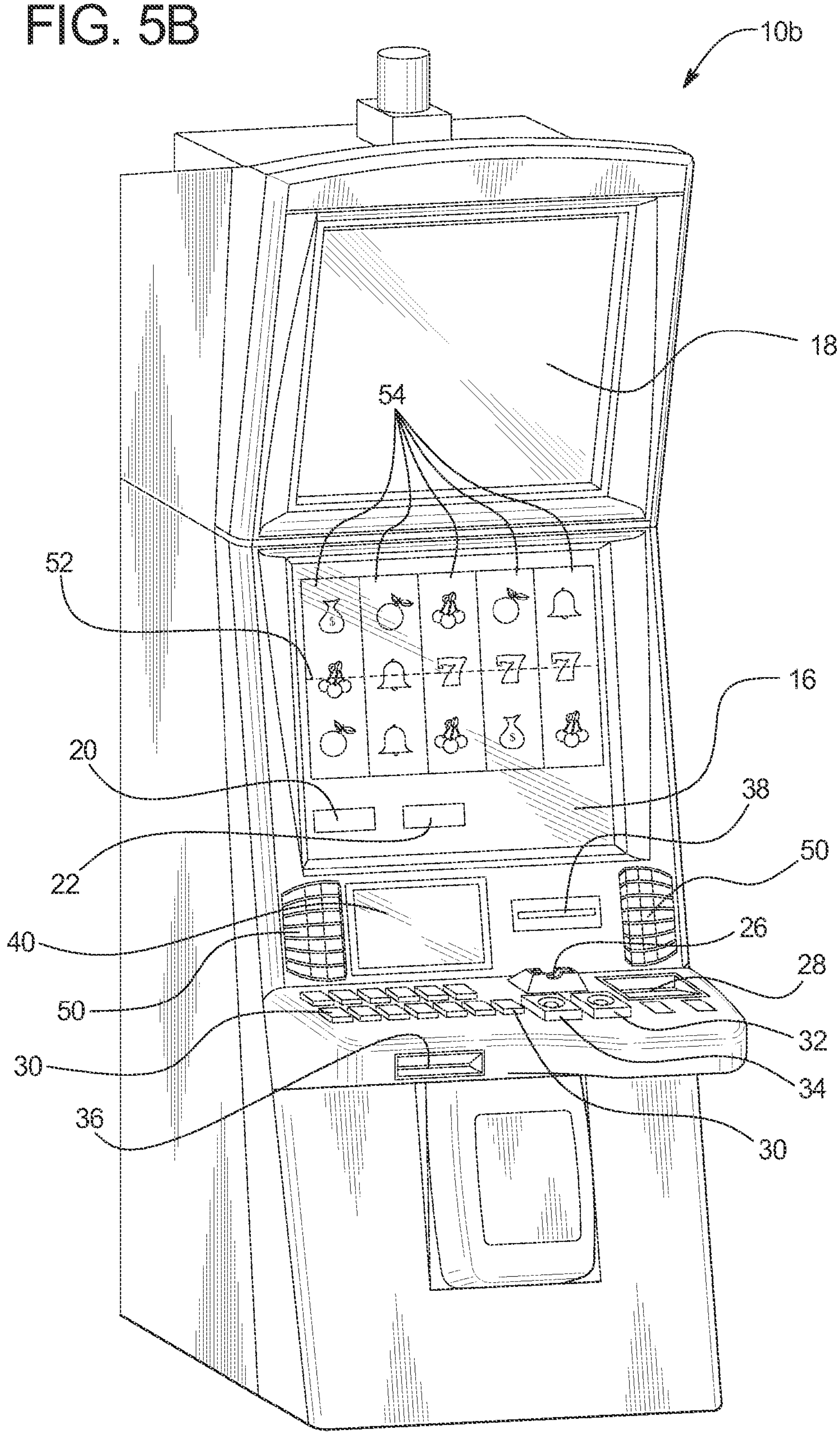
Figure 6A:
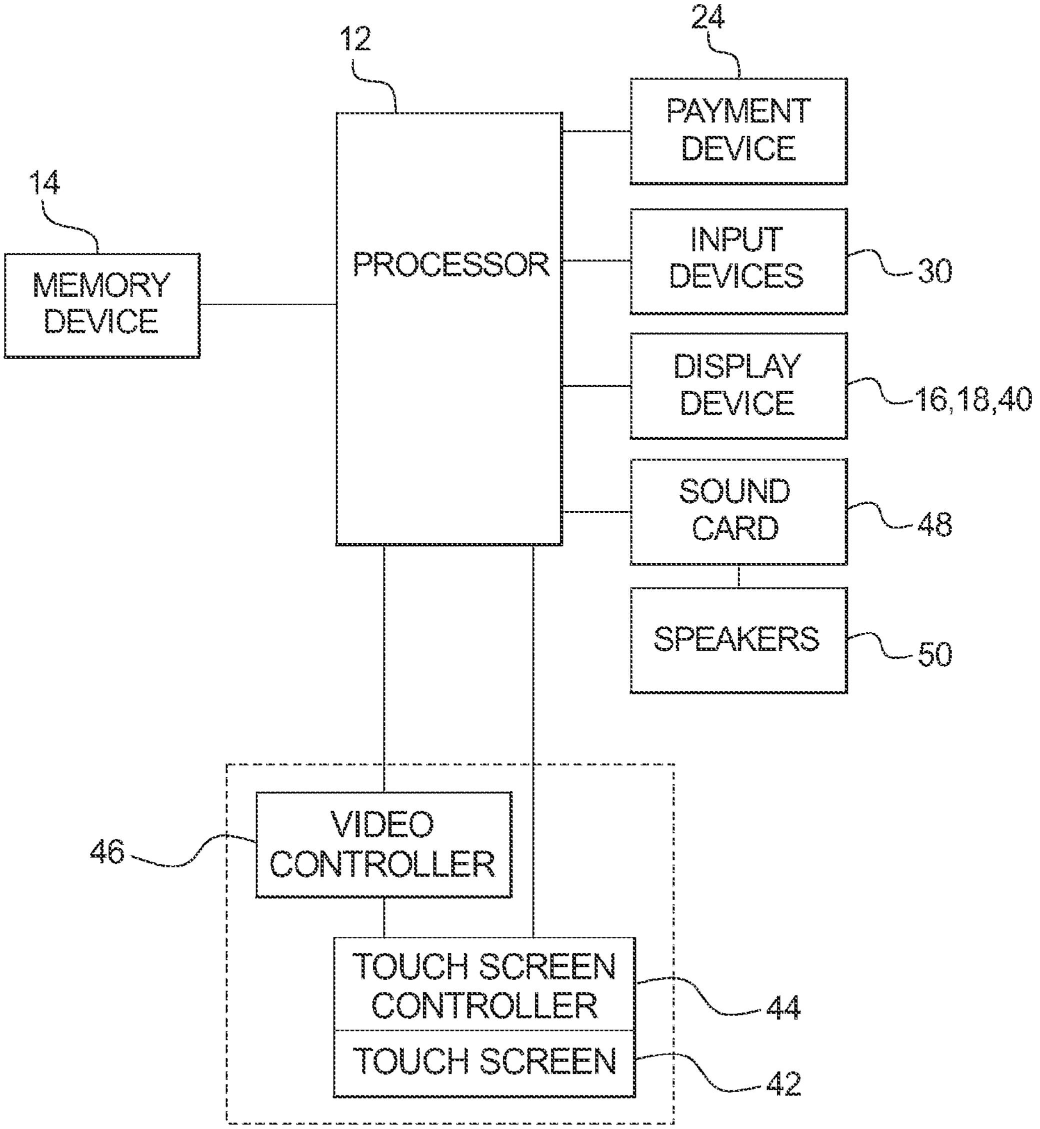
FIG. 6A is a schematic block diagram of one embodiment of an electronic configuration for one of the electronic gaming machines disclosed herein.
Figure 6B:
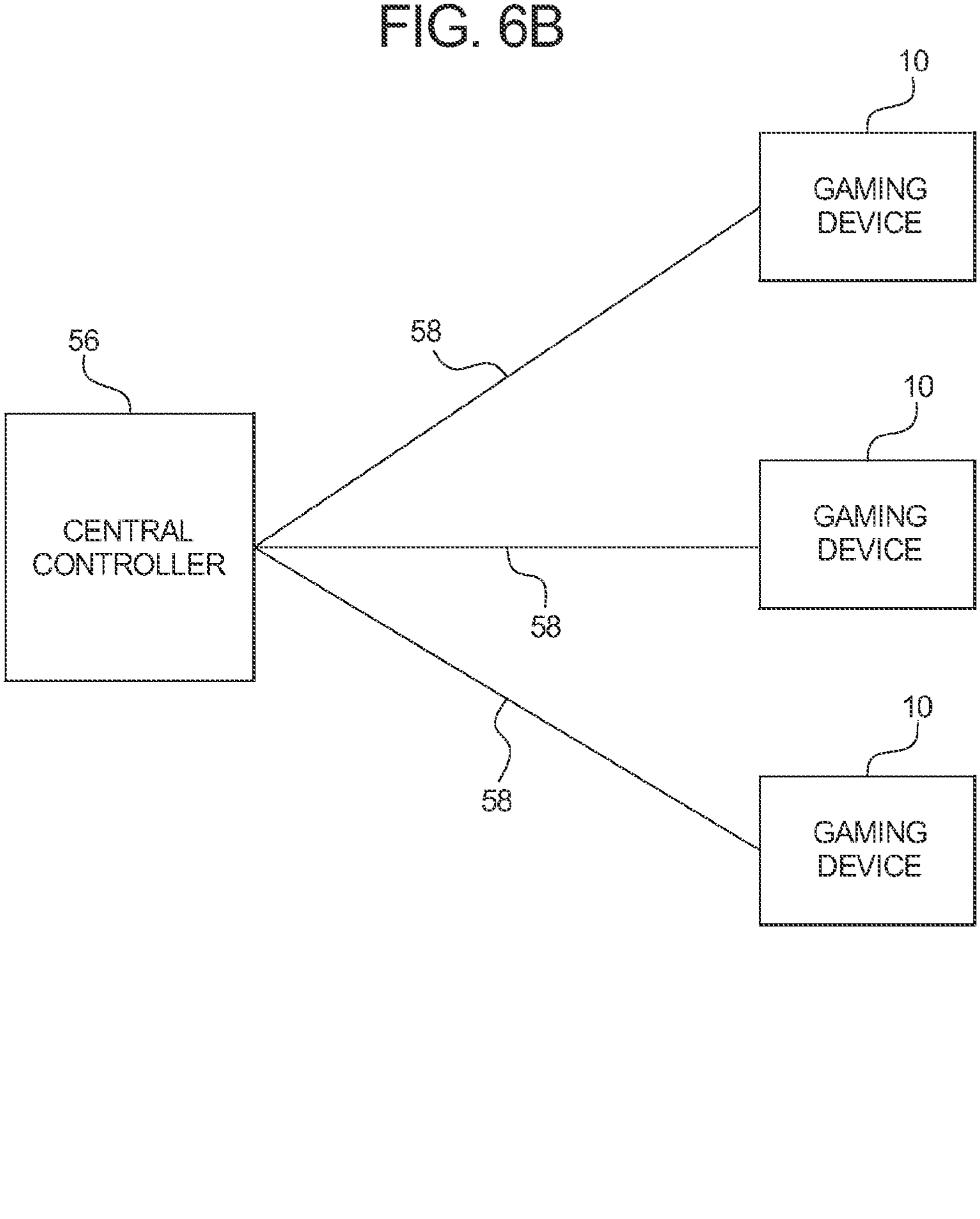
FIG. 6B is a schematic block diagram of one embodiment of a network configuration for a gaming system including a plurality of electronic gaming machines disclosed herein.

As generally illustrated in FIG. 2, the present disclosure further contemplates that, in certain embodiments, a display device associated with a large group of EGMs, such as a group including all one thousand EGMs on a casino floor, will inform players that a quantity of the EGMs in the group are in the hot mode without informing the players which specific EGMs are in the hot mode. For example, as shown in FIG. 2, a display device may inform players that twenty-five out of the one thousand EGMs on a casino floor are in the hot mode or will be in the hot mode for the next thirty minutes.

In certain embodiments, each individual EGM capable of entering the hot mode has a digital glass attract that plays when that EGM, which is connected to the central server, is instructed to either become hot or remain normal. That is, in these embodiments, the attract plays when the EGM (or the central server, depending upon the embodiment) determines whether the EGM should enter the hot mode. This attract would remind the player or provide a clue to the player that the EGM the player is playing may have just entered the hot mode (i.e., that the EGM made or is making a determination as to whether to enter the hot mode).

The present disclosure contemplates that, in certain embodiments, the determination of whether an EGM is in the hot mode is made regardless of whether that EGM is being played or being actively played. An EGM is being actively played if the player of that EGM is playing the primary wagering game of that EGM (i.e., placing wagers on plays of the primary wagering game) at least at a predefined minimum rate during a predefined time period, or has made a predefined minimum amount of wagers during a predefined time period. For example, an EGM may be in active status when a player has played the primary wagering game associated with that EGM in a fifteen second period prior to the determination point. The present disclosure further contemplates that, in certain embodiments, the determination of whether an EGM is in the hot mode is made only for an EGM if that EGM is being played or being actively played.

In one example embodiment, a standalone EGM is configured according to a specified timetable to determine whether that EGM is in the hot mode (i.e., the EGM asks itself "am I hot?" at certain points in time, such as times of day). In this embodiment, the EGM includes a set or pool of a plurality of numbers, certain of which are designated as hot mode numbers. It should be appreciated that the quantity of numbers included in the pool of numbers and the quantity of numbers that are hot mode numbers are pre-specified by a "chance to be hot" percentage that can be set by the EGM manufacturer or the casino operator. That is, the EGM manufacturer or the casino operator can set the probability that the EGM will determine that the EGM will enter the hot mode by setting a desired quantity of numbers in the pool and a desired quantity of hot mode numbers. According to the specified timetable, in this example embodiment, each time a first predetermined time period elapses and a second predetermined time period begins, the EGM randomly determines a single number with replacement from the pool. If the determined number matches one of the hot mode numbers, the EGM enters the hot mode and remains in the hot mode until the second predetermined time period time elapses and another random number is chosen from the pool. If the determined number does not match any of the hot numbers, the EGM will either remain in the normal mode or switch from the hot mode to the normal mode until the second predetermined time period expires and another random number is chosen from the pool.

It should be appreciated that the EGM may determine the designated period (such as the first and second predetermined time periods in the above example) in a similar manner. For example, certain of the pool of numbers may be associated with a first designated period, certain other of the pool of numbers may be associated with a second designated period, and certain other of the pool of numbers may be associated with a third designated period. To determine the designated period, the EGM randomly selects one of the pool of numbers with replacement and determines whether the selected number matches one of the numbers associated with the first designated period, second designated period, or third designated period. The EGM sets the designated period accordingly.

It should thus be appreciated from the above examples that the EGM (or server or central controller) may randomly start the hot mode and randomly end the hot mode. That is, the designated period in which the EGM is in the hot mode is initiated randomly (such as by the selection and match of a random number, as described above) and is terminated randomly (such as by the selection and match of a random number, as described above). Thus, the designated period itself is randomly determined in these embodiments.

In certain embodiments including the pool of numbers discussed above, certain of the numbers are associated with one of a plurality of different hot modes and certain other numbers are associated with a different one of the different hot modes. In these embodiments, the EGM randomly selects one of the pool of numbers to determine which hot mode to employ. In other embodiments including the pool of numbers, certain of the numbers are associated with one of a plurality of different average expected payback percentages and certain other numbers are associated with a different one of the different average expected payback percentages. In these embodiments, the EGM randomly selects one of the pool of numbers to determine which average expected payback percentage to employ for the hot mode.

In another example embodiment including a group or bank of EGMs, each of the EGMs enters the hot mode when that EGM receives a command from a server (instead of from the EGM as in the above example). The server is configured to make a determination based on a specified timetable, like in the above standalone configuration, or based on another predesignated time, such as at the end of a communal bonus. When accompanied by a dramatic presentation (such as some giant impossible to follow shell game with no reveal), it could serve as a reminder to the players and any passersby that the bank of EGMs includes an EGM in the hot mode.

In another example embodiment, for all eligible EGMs (i.e., EGMs that have been designated as capable of entering the hot mode), a central server may send out a command to make one or more of the eligible EGMs go into their hot modes. Much like the banked EGM setup, the central server could determine to make an EGM or set of EGM go into their hot modes based on a timer or randomly drawn number.

The present disclosure further contemplates several different ways to structure an EGM to provide for the hot mode or to increase the average expected payback percentage of the EGM during the designated period to provide a greater average expected payback percentage during the designated period. Prior to discussing such different ways, it should be appreciated that the present disclosure contemplates that, in various embodiments, the average expected payback percentage is not adjusted or increased by increasing any of the payout amounts for any of the winning symbols or winning symbol combinations, because doing so would inform a player of this adjustment to the paytable. In other words, the player may be able to readily determine that an EGM is in the hot mode if the change in the average expected payback percentage is accomplished by increasing a payout amount for any winning symbol or winning symbol combination (such as by increasing a payout amount of a winning symbol combination from 100 credits in the default mode to 200 credits in the hot mode). Thus, the present disclosure contemplates other methods to provide the hot mode.

In various embodiments, the present disclosure contemplates that to structure the EGM to provide for the hot mode by increasing the average expected payback percentage during the designated period, the likelihood of occurrence of one or more designated symbols which are winning symbols or which are part of winning symbol combinations can be increased. This can be accomplished in a variety of different manners.

In one embodiment: (a) the symbols and the number of symbols used in the wagering game do not change; (b) the probability of occurrence of each of one or more designated symbols which are winning symbols or which are part of any winning symbol combinations is increased; and (c) the probability of occurrence each of one or more non-designated symbols which are not winning symbols or which are not part of any winning symbol combinations is decreased. In other words, the present disclosure contemplates employing a greater quantity of certain symbols which are winning symbols or part of any winning symbol combinations. For example, a CH or Cherry symbol, which is a winning symbol in this example, has a probability of occurrence of 10% while an EGM is in the hot mode and a probability of occurrence of 5% when the EGM is in the normal or default mode.

In another embodiment: (a) the symbols and the number of symbols used in the wagering game do not change; (b) the probability of occurrence of each of one or more high award designated symbols which are high award winning symbols or which are part of any high award winning symbol combinations is increased; and (c) the probability of occurrence each of one or more other low award designated symbols which are low award winning symbols or which are part of any low award winning symbol combinations is decreased.

In another embodiment: (a) the number of each of one or more designated symbols which are winning symbols or which are part of any winning symbol combinations is increased (and the associated overall probability of occurrence of those symbols is increased); and (b) the number of each of one or more non-designated symbols which are not winning symbols or which are not part of any winning symbol combinations is decreased (and associated overall probability of occurrence is decreased). It should be appreciated that if this is done too dramatically, this may inform a player that the EGM is in the hot mode.

In another embodiment: (a) the number of each of one or more high award designated symbols which are high award winning symbols or which are part of high award winning symbol combinations is increased (and the associated overall probability of occurrence of those symbols is increased); and (b) the number of each of one or more low award designated symbols which are low award winning symbols or which are part of any low award winning symbol combinations is decreased (and the associated overall probability of occurrence is decreased). It should also be appreciated that if this is done too dramatically, this may inform a player that the EGM is in the hot mode.

In another embodiment: (a) the symbols and the number of symbols used in the wagering game do not change; (b) the probability of occurrence of each of the symbols occurring do not change; and (c) the type of symbol combinations which are winning combinations change. For instance, in the normal mode, all winning symbol combinations must occur on one of the paylines for a slot EGM, and in the hot mode, one or more of the winning symbol combinations can occur in a scatter mode (as further described in the example below).

In another one embodiment: (a) the symbols and the number of symbols used in the wagering game do not change; (b) the probability of occurrence of each of one or more secondary game triggering symbols is increased; and (c) the probability of occurrence of one or more non-secondary game triggering symbols is decreased. This causes a secondary game to occur more often to provide for the hot mode or to increase the average expected payback percentage during the designated period of time.

In another embodiment, (a) the number of secondary game triggering symbols is increased (and the associated overall probability of occurrence of those symbols is increased); and (b) the number of each of one or more non-secondary game triggering symbols is decreased (and associated overall probability of occurrence is decreased). It should also be appreciated that if this is done too dramatically, this may inform a player that the EGM is in the hot mode.

In other embodiments, the present disclosure contemplates that to structure the EGM to provide for the hot mode or to increase the average expected payback percentage during the designated period, the average expected award in one or more secondary games is increased.

In other embodiments, the present disclosure contemplates that to structure the EGM to provide for the hot mode or to increase the average expected payback percentage during the designated period, one or more additional mystery awards are available to be provided to the player.

In one example embodiment, an EGM has a paytable for a wagering game that has multiple sections. Each section includes its own set of symbols, reels, and associated probabilities and payout values, and represents a stage of play, such as a primary wagering game and a secondary game. An EGM capable of entering the hot mode has multiple primary wagering game or stage paytable sections and multiple secondary game or stage sections. One of the primary wagering game or stage paytable sections and one of the secondary game or stage sections are for use when the EGM is in the normal mode, and another of the primary wagering game or stage paytable sections and another of the secondary game or stage sections are for use when the EGM is in the hot mode. Thus, when the EGM is in the hot mode, the EGM would use the paytable sections associated with the hot mode. That is, the EGM would employ certain of a plurality of predetermined paytables associated with the primary wagering game and the secondary game that are associated with the hot mode. In certain embodiments, one or more of the predetermined paytables associated with the secondary game reflect a higher average expected payback percentage with respect to the corresponding primary game paytables by offering a pool of larger prizes to draw from for a selection game. In other embodiments, one or more of the predetermined paytables associated with the secondary game reflect a higher average expected payback percentage with respect to the corresponding primary game paytables by offering a free games bonus with a greater number of symbols to retrigger the bonus.

The present disclosure contemplates that several different methods can be employed to augment the pay frequency of an EGM's hot mode paytable section without modifying the game rules. For example, for a primary wagering game, one method could be the use of scatters. By adding scatter wins or symbols into the paytable, the chances of hitting more scatters in the visible window increases, but the amount won for the same number of scatters may stay the same. FIG. 3 illustrates an example of an EGM normal scatter paytable, while FIG. 4 illustrates an example of an EGM hot mode scatter paytable.

The present disclosure contemplates that another example method for providing the hot mode without changing game rules is by adjusting pay frequency through the use of one or more nudge symbols. In mechanical or video spinning reel games, when a non-winning combination occurs, the reels can nudge themselves upwardly or downwardly into a different position, which can provide or cause a winning symbol combination to occur. In an example of an EGM in the hot mode, a quantity of ghost symbols designated as nudge symbols could be increased, causing more losing symbol combinations to become winning symbol combinations. In certain embodiments, the EGM can make this appear to the player as a random nudge.

In another embodiment with nudge symbols, using the same paytable section, the EGM employs two different types of nudging ghost symbols, such as GH1 and GH2 symbols, which are both represented by blank spots on the reels. When the EGM is in the normal or default mode, only GH1 symbols on a payline will cause the reels to nudge, and GH2 symbols are treated as normal ghosts that do not cause the reels to nudge. When the EGM is in the hot mode, however, both GH1 and GH2 symbols cause the reels to nudge.

Electronic Gaming Machine and Gaming System

The present disclosure contemplates a variety of different electronic gaming machines ("EGMs") each having one or more of a plurality of different features. Referring now to the drawings, two example alternative embodiments of an EGM of the present disclosure are illustrated in FIGS. 1A and 1B as EGM 10*a* and 10*b*, respectively. EGM 10*a* and/or EGM 10*b* are generally referred to herein as EGM 10.

In certain embodiments, such as those illustrated in FIGS. 1A and 1B, the EGM has a support structure, housing, or cabinet that provides support for a plurality of displays, inputs, controls, and other features of a conventional EGM. It is configured so that a player may operate it while standing or sitting. The EGM may be positioned on a base or stand, or may be configured as a pub-style table-top game (not shown) that a player may operate typically while sitting. As illustrated by the different configurations shown in FIGS. 1A and 1B, the EGM may have varying cabinet and display configurations.

In various embodiments, the EGM includes at least one processor, such as a microprocessor, a microcontroller-based platform, a suitable integrated circuit, or one or more application-specific integrated circuits (ASIC's). For example, the embodiment of the EGM illustrated in FIG. 2A includes a processor 12. The processor is in communication with, or operable to access or to exchange signals with, at least one data storage or memory device. For example, the embodiment of the EGM illustrated in FIG. 2A includes a memory device 14. The memory device stores program code and instructions executable by the processor to control the EGM. The memory device also stores other data, such as image data, event data, player input data, random or pseudo-random number generators, paytable data or information, and applicable game rules that relate to the play of one or more games (such as wagering games) on the EGM as described in detail below. In certain embodiments, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In other embodiments, the memory device includes flash memory and/or EEPROM (electrically erasable programmable read only memory). It should be appreciated that any other suitable magnetic, optical, and/or semiconductor memory may operate in conjunction with the EGMs disclosed herein. In certain embodiments, the processor and the memory device reside within a cabinet of the EGM.

In various embodiments, part or all of the program code and/or the operating data described above can be stored in a detachable or removable memory device including, but not limited to, a cartridge, disk, CD ROM, DVD, USB memory device, or other suitable non-transitory computer readable medium. In certain embodiments, part or all of the program code and/or the operating data described above can be downloaded to the memory device through a suitable network.

In certain embodiments, an operator or a player can use such a removable memory device in a desktop computer; a laptop computer; a hand-held device, such as a personal digital assistant (PDA); a portable computing or mobile device; or another computerized platform to implement part of the present disclosure. In various embodiments, the EGMs disclosed herein are operable over a wireless network, for example as part of a wireless gaming system. In one such embodiment, the EGM is a hand-held device, a mobile device, or any other suitable wireless device that enables a player to play any suitable game at a variety of different locations. In various embodiments in which the EGM is a hand-held device, a mobile device, or any other suitable wireless device, at least one memory device and at least one processor which control the game or other operations of the hand-held device, mobile device, or other suitable wireless device are located: (a) at the hand-held device, mobile device or other suitable wireless device; (b) at a central server or central controller; or (c) at any suitable combination of the central server or central controller and the hand-held device, mobile device or other suitable wireless device.

In certain embodiments, the EGM disclosed herein is a device that has obtained approval from a regulatory gaming commission, and in other embodiments, the EGM disclosed herein is a device that has not obtained approval from a regulatory gaming commission.

In various embodiments, the EGM includes one or more display devices controlled by the processor and configured to display any games provided by the EGM as well as any suitable information associated with those games. The display devices are typically connected to or mounted on the cabinet of the EGM. For example, the embodiments of the EGM illustrated in FIGS. 1A and 1B each include a central display device 16 configured to display any games provided by that EGM. In another example, the embodiment of the EGM illustrated in FIG. 1B includes an upper display device 18 in addition to central display device 16. In another example, the embodiment of the EGM illustrated in FIG. 2A includes a plurality of display devices, including central display device 16, upper display device 18, and a player tracking display 40. The display devices may also serve as digital glass operable to advertise certain games or other aspects of the gaming establishment in which the EGM is located. In certain embodiments, the EGM includes a credit display that displays a player's current number of credits, cash, account balance, or the equivalent. For example, the embodiments of the EGM illustrated in FIGS. 1A and 1B, the EGM each include a credit display 20. In various embodiments, the EGM includes a bet display that displays an amount wagered by a player for one or more plays of one or more games. For example, the embodiments of the EGM illustrated in FIGS. 1A and 1B each includes a bet display 22. In other embodiments, as described in more detail below, the EGM includes a player tracking display that displays information regarding a player's play tracking status (described in detail below). For example, the embodiments of the EGM illustrated in FIGS. 1A and 1B each include player tracking display 40.

In various embodiments, at least one display device is a mobile display device, such as a display device of a PDA or a tablet PC, that enables play of at least a portion of a game at a location remote from the EGM.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described in more detail below, the display device includes a touch-screen with an associated touch-screen controller. It should be appreciated that the display devices may be of any suitable size and configuration, such as a square, a rectangle, or an elongated rectangle.

The display devices of the EGM are configured to display at least one and preferably a plurality of game or other suitable images, symbols, and indicia, such as any visual representation or exhibition of the movement of objects, such as: mechanical, virtual, or video reels and wheels; dynamic lighting; video images; images of people, characters, places, things, and faces of cards; and the like.

In certain alternative embodiments, certain of the symbols, images, and indicia of the display device or displayed on the display device are in mechanical form. That is, the display device may include any electromechanical device, such as one or more mechanical objects, such as one or more rotatable wheels, reels, or dice, configured to display at least one or a plurality of game or other suitable images, symbols, or indicia.

In various embodiments, the EGM includes at least one payment device in communication with the processor. For example, the embodiment of the EGM illustrated in FIG. 2A includes a payment device 24. The payment device, such as a payment acceptor, may includes: a note, ticket, or bill acceptor into which a player inserts paper money, a ticket, or a voucher; and a coin slot into which the player inserts money, coins, or tokens. For example, the embodiments of the EGM illustrated in FIGS. 1A and 1B each include a note, ticket, or bill acceptor 28 and a coin slot 26. In other embodiments, payment devices such as readers or validators for credit cards, debit cards, or credit slips may accept payment. In certain embodiments, a player may insert an identification card into a card reader of the EGM. In one embodiment, the identification card is a smart card having a programmed microchip, a coded magnetic strip, or a coded rewritable magnetic strip. The programmed microchip or magnetic strips are coded with a player's identification, credit totals (or related data), and/or other relevant information. In another embodiment, a player may carry a portable device, such as a cell phone, a radio frequency identification tag, or any other suitable wireless device, that communicates a player's identification, credit totals (or related data), and other relevant information to the EGM. In one embodiment, money may be transferred to an EGM through electronic funds transfer. When a player funds the EGM, the processor determines the amount of funds entered and displays the corresponding amount on the credit display or any other suitable display as described above.

In certain embodiments, the EGM includes at least one and preferably a plurality of input devices in communication with the processor. For example, the embodiments of the EGM illustrated in FIGS. 1A, 1B, and 2A each include a plurality of input devices 30. The input devices can include any suitable device that enables a player to produce an input signal that is received by the processor. In one embodiment, after appropriate funding of the EGM, the input device is a game activation device, such as a play button or a pull arm (not shown) that is used by a player to start any game or sequence of events associated with the EGM. For example, the embodiments of the EGM illustrated in FIGS. 1A and 1B each include a play button 32. The play button can be any suitable play activator, such as a bet one button, a max bet button, or a repeat the bet button. It should be appreciated that, in some embodiments, the EGM begins the game play automatically upon appropriate funding. In certain other embodiments, the EGM automatically activates game play upon the player engaging one of the play buttons.

In various embodiments, one input device is a bet one button. A player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In certain embodiments, one input device is a bet max button (not shown) that enables a player to bet the maximum wager permitted for a game of the EGM.

In other embodiments, one input device is a cash out button. For example, the embodiments of the EGM illustrated in FIGS. 1A and 1B each include a cash out button 34. A player may push the cash out button and cash out to receive a cash payment or other suitable form of payment corresponding to the number of remaining credits. In one embodiment, when a player cashes out, a payment device, such as a ticket, payment, or note generator, prints or otherwise generates a ticket or credit slip to provide to the player. The player receives the ticket or credit slip, and may redeem the value associated with the ticket or credit slip via a cashier (or other suitable redemption system). For example, the embodiments of the EGM illustrated in FIGS. 1A and 1B each include a ticket, payment, or note generator 36. In another embodiment, when a player cashes out, the player receives the coins or tokens in a coin payout tray. It should be appreciated that any suitable payout mechanisms, such as funding to a player's electronically recordable identification card or smart card, may be implemented in accordance with the EGM disclosed herein.

In certain embodiments, as mentioned above, one input device is a touch-screen coupled with a touch-screen controller or some other touch-sensitive display overlay to allow for player interaction with the images on the display. The touch-screen and the touch-screen controller are connected to a video controller. A player can make decisions and input signals into the EGM by touching the touch-screen at the appropriate locations. One such input device is a conventional touch-screen button panel. For example, the embodiment of the EGM illustrated in FIG. 2A includes a touch-screen 42 coupled to a touch-screen controller 44, both of which are connected to a video controller 46.

The EGM may further include a plurality of communication ports for enabling communication of the processor with external peripherals, such as external video sources, expansion buses, game or other displays, an SCSI port, or a keypad.

In certain embodiments, the EGM includes a sound generating device controlled by one or more sound cards that function in conjunction with the processor. For example, the embodiment of the EGM illustrated in FIG. 2A includes a sound card 48. In one of these embodiments, the sound generating device includes at least one and preferably a plurality of speakers or other sound generating hardware and/or software for generating sounds, such as by playing music for any games or by playing music for other modes of the EGM, such as an attract mode. For example, the embodiments of the EGM illustrated in FIGS. 1A, 1B, and 2A each include a plurality of speakers 50. In another of these embodiments, the EGM provides dynamic sounds coupled with attractive multimedia images displayed on one or more of the display devices to provide an audio-visual representation or to otherwise display full-motion video with sound to attract players to the EGM. During idle periods, the EGM may display a sequence of audio and/or visual attraction messages to attract potential players to the EGM. The videos may also be customized to provide any appropriate information.

In various embodiments, the EGM includes a sensor, such as a camera, in communication with the processor (and possibly controlled by the processor) and that is selectively positioned to acquire an image of a player actively using the EGM and/or the surrounding area of the EGM. In various embodiments, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into one of the games as a game image, symbol or indicia.

The present disclosure may be implemented in various configurations for one or more EGMs, including but not limited to: (1) a dedicated EGM wherein computerized instructions for controlling any games provided by the EGM are provided with the EGM prior to delivery to a gaming establishment; and (2) a changeable EGM wherein computerized instructions for controlling any games provided by the EGM are downloadable to the EGM through a data network or remote communication link after the EGM is in a gaming establishment. In certain embodiments, the computerized instructions for controlling any games provided by an EGM are executed by at least one central server, central controller, or remote host. In such "thin client" embodiments, the central server or controller remotely controls any games (or other suitable interfaces), and the EGM is utilized to display such games (or suitable interfaces) and receive one or more inputs or commands from a player. In other embodiments, the computerized instructions for controlling any games provided by an EGM are communicated from the central server, central controller, or remote host to an EGM local processor and EGM local memory devices. In such "thick client" embodiments, the EGM local processor executes the communicated computerized instructions to control any games (or other suitable interfaces).

In certain embodiments, one or more EGMs in a gaming system may be thin client EGMs, and one or more EGMs in the gaming system may be thick client EGMs. In other embodiments, certain functions of one or more EGMs in a gaming system are implemented in a thin client environment, and certain other functions of one or more EGMs in the gaming system are implemented in a thick client environment. In one such embodiment, computerized instructions for controlling any primary or base games are communicated from the central server or controller to one or more of the EGMs in a thick client configuration (as explained in detail below), and computerized instructions for controlling any secondary or bonus games or functions are executed by a central server or controller in a thin client configuration (as explained in more detail below).

In various embodiments, a plurality of EGMs are capable of being connected together through a data network. In certain embodiments, the data network is a local area network (LAN) in which one or more of the EGMs are substantially proximate to each other and to an on-site central server or controller, such as in a gaming establishment or a portion of a gaming establishment. In other embodiments, the data network is a wide area network (WAN) in which one or more of the EGMs are in communication with at least one off-site central server or controller. In these embodiments, one or more of the EGMs may each be located: in an area of a gaming establishment different than an area of the gaming establishment in which the off-site central server or controller is located, or within a different gaming establishment than the gaming establishment in which the off-site central server or controller is located. Thus, certain embodiments employing the WAN may include an off-site central server or controller and an off-site EGM located within gaming establishments in the same geographic area, such as a city or state. The WAN gaming system may be substantially identical to the LAN gaming system described above, although the number of EGMs in each system may vary relative to one another.

In certain embodiments, the data network is an internet or intranet. In these embodiments, the operation of the EGM can be viewed at the EGM with at least one internet browser. In these embodiments, the operation of the EGM and the accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In these embodiments, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

In various embodiments, one or more of the EGMs are in communication with each other and/or at least one central server, central controller, or remote host through a data network or remote communication link. For example, in the embodiment of the gaming system illustrated in FIG. 2B, a plurality of EGMs 10 are connected to a central server or controller 56 via a data network 58. The central server or controller is any suitable central server or computing device that includes at least one processor and at least one memory or storage device. In different such embodiments, the central server or controller is a progressive controller (as described in detail below) or a processor of one of the EGMs in the gaming system. The processor of each EGM is configured to transmit and receive events, messages, commands, or any other suitable data or signal between the individual EGM and the central server or controller. The EGM processor is operable to execute such communicated events, messages, or commands in conjunction with the operation of the EGM. Moreover, the processor of the central server or controller is designed to transmit and receive events, messages, commands, or any other suitable data or signal between the central server or controller and each of the individual EGMs. The central server or controller processor is operable to execute such communicated events, messages, or commands in conjunction with the operation of the central server or controller. It should be appreciated that one, more, or each of the functions of the central server or controller as disclosed herein may be performed by one or more EGM processors. It should be further appreciated that one, more, or each of the functions of one or more EGM processors as disclosed herein may be performed by the central controller or controller.

In certain embodiments, the memory device of the central server or controller stores different game programs and instructions executable by the EGM processor to control the EGM. Each executable game program represents a different game or type of game that may be played on one or more of the EGMs in the gaming system. Such different games may include the same or substantially the same game play with different paytables. In different embodiments, the executable game program is for a base or primary game (referred to herein as the primary game), a secondary or bonus game or function (referred to herein as the secondary game), or both. In other embodiments, the game program may be executable as a secondary game to be played simultaneously with the play of a primary game (which may be downloaded to or otherwise stored on the EGM), or vice versa.

In these embodiments, each EGM includes at least one or more display devices and/or one or more input devices to enable a player to interact with that EGM. A local processor, such as the above-described EGM processor or a processor of a local server, is operable with the display device(s) and/or the input device(s) of one or more of the EGMs.

In operation, the central server or controller is operable to communicate one or more of the stored game programs to at least one local processor of an EGM. In different embodiments, the stored game programs are communicated or delivered to the at least one local processor by embedding the communicated game program in a device or a component (such as a microchip to be inserted in an EGM), writing the game program on a disc or other media, or uploading or streaming the game program over a dedicated data network, internet, or a telephone line. After the stored game programs are communicated from the central server or controller, the local processor executes the communicated game program to facilitate play of the communicated game program by a player through the display device(s) and/or input device(s) of the EGM. That is, when a game program is communicated to a local processor, the local processor changes the game or type of game that a player may play using the EGM.

In certain embodiments, any award(s) and/or other game outcome(s) provided to a player for the primary game and/or the secondary game are determined by the central server or controller and provided to the player at the EGM. In these embodiments, each of a plurality of such EGMs is in communication with the central server or controller. Upon the player initiating game play at one of the EGMs, the initiated EGM communicates a request for an award and/or another game outcome to the central server or controller.

In various embodiments, the central server or controller receives the award request or the other game outcome request, and randomly generates one or more awards and/or other game outcomes for the primary game and/or the secondary game based on probability data. In certain such embodiments, this random determination is provided through utilization of a random number generator (RNG), such as a true RNG, a pseudo RNG, or another suitable randomization process. In certain of these embodiments, each award or other game outcome is associated with a probability, and the central server or controller generates the award or other game outcome to be provided to the player based on the associated probabilities. In these embodiments, since the central server or controller generates awards and other game outcomes randomly or based upon one or more probability calculations, there is no certainty that the central server or controller will ever provide the player with any specific award or other game outcome.

In alternative embodiments, the central server or controller maintains one or more predetermined pools or sets of predetermined awards and/or other game outcomes. In these embodiments, the central server or controller receives the award and/or other game outcome request and independently selects a predetermined award and/or other game outcome from the sets or pools. The central server or controller flags or marks the selected award and/or other game outcome as used. Once an award or other game outcome is flagged as used, it is prevented from further selection from its respective set or pool; that is, it cannot be selected by the central server or controller upon another wager. The provided award and/or other game outcome can include a primary game award or other game outcome, a secondary game award or other game outcome, primary and secondary game award or other game outcomes, or a series of awards or other game outcomes such as free games.

The central server or controller communicates the generated or selected award and/or other game outcome to the initiated EGM. The EGM receives the generated or selected award and/or other game outcome and provides the award and/or other game outcome to the player.

It should be appreciated that, in certain embodiments, how the generated or selected award or other game outcome is to be presented or displayed to the player, such as a specific reel symbol combination or a hand of cards dealt in a card game, is also determined by the central server or controller and communicated to the initiated EGM to be presented or displayed to the player. Such central production or control can assist a gaming establishment or other entity in maintaining appropriate records, controlling gaming, reducing and preventing cheating or electronic or other errors, reducing or eliminating win-loss volatility, and the like.

In various embodiments, the EGM itself determines any award(s) and/or other game outcome(s) for a play of the primary game and/or the secondary game. That is, in certain embodiments, the EGM local processor randomly generates awards and/or game outcomes based on probability data in a manner similar to that described above with respect to the central sever or controller. Further, in certain other embodiments, the EGM local processor maintains the predetermined sets or pools of awards and/or other game outcomes and selects certain of those awards and/or other game outcomes in a manner similar to that described above with respect to the central server or controller. It should thus be appreciated that, in these embodiments, the EGM makes its own award and/or other game outcome determinations.

In certain embodiments, a predetermined award or other game outcome is determined for each of a plurality of linked or networked EGMs based on the results of a bingo, keno, or lottery game. In these embodiments, each individual EGM utilizes one or more bingo, keno, or lottery games to determine the predetermined award or other game outcome provided to the player for the interactive game played at that EGM. In one embodiment, the bingo, keno, or lottery game is displayed to the player. In another embodiment, the bingo, keno, or lottery game is not displayed to the player, but the results of the bingo, keno, or lottery game determine the predetermined award or other game outcome for the primary and/or secondary game.

In the various bingo embodiments, as each EGM is enrolled in the bingo game, such as upon an appropriate wager or engaging an input device, the enrolled EGM is provided or associated with a different bingo card. Each bingo card consists of a matrix or array of elements, wherein each element is designated with separate indicia, such as a number. It should be appreciated that each different bingo card includes a different combination of elements. For example, if four bingo cards are provided to four enrolled EGMs, the same element may be present on all four of the bingo cards while another element may solely be present on one of the bingo cards.

In operation of these embodiments, upon providing or associating a different bingo card with each of a plurality of enrolled EGMs, the central server or controller randomly selects or draws, one at a time, a plurality of the elements. As each element is selected, a determination is made for each EGM as to whether the selected element is present on the bingo card provided to that enrolled EGM. This determination can be made by the central server or controller, the EGM, a combination of the two, or in any other suitable manner. If the selected element is present on the bingo card provided to that enrolled EGM, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the EGM requires the player to engage a daub button (not shown) to initiate the process of the EGM marking or flagging any selected elements.

After one or more predetermined patterns are marked on one or more of the provided bingo cards, an award and/or other game outcome is determined for each of the enrolled EGMs based, at least in part, on the selected elements on the provided bingo cards. As described above, the award and/or other game outcome determined for each EGM enrolled in the bingo game is utilized by that EGM to determine the predetermined award and/or other game outcome provided to the player. For example, a first EGM to have selected elements marked in a predetermined pattern is provided a first outcome of win $10 which will be provided to a first player regardless of how the first player plays in a first game, and a second EGM to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled EGM will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of an EGM may be provided a supplemental or intermittent award regardless of whether the enrolled EGM's provided bingo card wins or does not win the bingo game as described above.

In certain embodiments, one or more of the EGMs are in communication with a central server or controller for monitoring purposes only. That is, each individual EGM randomly generates the game outcomes to be provided to the player and the central server or controller monitors the activities and events occurring on the plurality of EGMs. In one embodiment, the gaming network includes a real-time or on-line accounting and gaming information system operably coupled to the central server or controller. The accounting and gaming information system of this embodiment includes a player database for storing player profiles, a player tracking module for tracking players, and a credit system for providing automated casino transactions.

In various embodiments, a plurality of EGMs at one or more gaming sites may be networked to the central server or controller in a progressive configuration (as known in the art), wherein a portion of each wager to initiate a primary game at each of the EGMs is allocated to one or more progressive awards. In certain embodiments, a progressive gaming system host site computer is coupled to a plurality of the central servers or controllers at a variety of mutually remote gaming sites for providing a multi-site linked progressive automated gaming system. In other embodiments, a progressive gaming system host site computer serves EGMs distributed throughout a number of properties at different geographical locations including, for example, different locations within a city or different cities within a state.

In certain embodiments, the progressive gaming system host site computer is maintained for the overall operation and control of the progressive gaming system. In these embodiments, a progressive gaming system host site computer oversees the entire progressive gaming system, and is the master for computing all progressive jackpots. All participating gaming sites report to, and receive information from, the progressive gaming system host site computer. Each central server or controller is responsible for all data communication between the EGM hardware and software and the progressive gaming system host site computer. In various embodiments, an individual EGM triggers a progressive award win. In other embodiments, a central server or controller (or the progressive gaming system host site computer) determines when a progressive award win is triggered. In certain other embodiments, an individual EGM and a central server or controller (or progressive gaming system host site computer) work in conjunction with each other to determine when a progressive win is triggered, such as through an individual EGM meeting a predetermined requirement established by the central server or controller.

In various embodiments, a progressive award win is triggered based on one or more game play events, such as the occurrence of a symbol-driven trigger event. In other embodiments, the progressive award triggering event or qualifying condition may be achieved by exceeding a certain amount of game play (such as number of games, number of credits, or amount of time), or by reaching a specified number of points earned during game play. In certain embodiments, an EGM is randomly or apparently randomly selected to provide a player of that EGM one or more progressive awards. In one such embodiment, the EGM does not provide any apparent reasons to the player for winning a progressive award, wherein winning the progressive award is not triggered by an event in or based specifically on any of the plays of any primary game. That is, the player is provided a progressive award without any explanation or alternatively with simple explanations. In another such embodiment, a player is provided a progressive award at least partially based on a game triggered or symbol triggered event, such as at least partially based on the play of a primary game.

In certain embodiments, one or more of the progressive awards are each funded via a side bet or side wager. In these embodiments, a player must place or wager a side bet to be eligible to win the progressive award associated with the side bet. In one such embodiment, the player must place the maximum bet and the side bet to be eligible to win one of the progressive awards. In another such embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the EGMs in the gaming system, via a gaming establishment, or via any suitable manner.

In other embodiments, one or more of the progressive awards are partially funded via a side-bet or side-wager that the player may make (and which may be tracked via a side-bet meter). In one such embodiment, one or more of the progressive awards are funded with only side-bets or side-wagers placed. In another such embodiment, one or more of the progressive awards are funded based on player's wagers as described above as well as any side-bets or side-wagers placed.

In alternative embodiments, a minimum wager level is required for an EGM to qualify to be selected to obtain one of the progressive awards. In one such embodiment, this minimum wager level is the maximum wager level for the primary game in the EGM. In another such embodiment, no minimum wager level is required for an EGM to qualify to be selected to obtain one of the progressive awards.

In certain embodiments, a plurality of players at a plurality of linked EGMs in a gaming system participate in a group gaming environment. In one such embodiment, a plurality of players at a plurality of linked EGMs work in conjunction with one another, such as by playing together as a team or group, to win one or more awards. In some embodiments, any award won by the group is shared, either equally or based on any suitable criteria, amongst the different players of the group. In other embodiments, a plurality of players at a plurality of linked EGMs compete against one another for one or more awards. In one such embodiment, a plurality of players at a plurality of linked EGMs participate in a gaming tournament for one or more awards. In another such embodiment, a plurality of players at a plurality of linked EGMs play for one or more awards, wherein an outcome generated by one EGM affects the outcomes generated by one or more linked EGMs.

In various embodiments of the present disclosure, the EGMs are associated with or otherwise integrated with one or more player tracking systems. Player tracking systems enable gaming establishments to recognize the value of customer loyalty through identifying frequent customers and rewarding them for their patronage. The EGM and/or player tracking system tracks any player's gaming activity at the EGM. In one such embodiment, the EGM includes at least one card reader in communication with the processor. For example, the embodiments of the EGM illustrated in FIGS. 1A and 1B each include a card reader 38. In this embodiment, a player is issued a player identification card which has an encoded player identification number that uniquely identifies the player. When a player inserts the player's playing tracking card into the card reader to begin a gaming session, the card reader reads the player identification number off the player tracking card to identify the player. The EGM and/or associated player tracking system timely tracks any suitable information or data relating to the identified player's gaming session. Directly or via the central controller, the EGM processor communicates such information to the player tracking system. The EGM and/or associated player tracking system also timely tracks when a player removes the player's player tracking card when concluding play for that gaming session. In another embodiment, rather than requiring a player to insert a player tracking card, the EGM utilizes one or more portable devices carried by a player, such as a cell phone, a radio frequency identification tag, or any other suitable wireless device to track when the player begins and ends a gaming session. In another embodiment, the EGM utilizes any suitable biometric technology or ticket technology to track when a player begins and ends a gaming session.

During one or more gaming sessions, the EGM and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows (not shown) which are displayed on the central display device and/or the upper display device.

As noted above, an EGM may include one or more primary games, such as one or more primary wagering games, and one or more secondary games. The EGM may include some or all of the features of conventional EGMs. The primary game or games and the secondary game or games may comprise any suitable games and/or wagering games, such as: electro-mechanical or video slot or spinning reel type games; video card games such as video poker games, video blackjack games, and video baccarat games; video keno games; video bingo games; and video selection games.

In various embodiments, the primary game is a slot game with one or more paylines. In these embodiments, the EGM includes at least one and preferably a plurality of reels, such as three to five reels, in either electromechanical form with mechanical rotating reels or video form with simulated reels and movement thereof. For example, the embodiments of the EGM illustrated in FIGS. 1A and 1B each include a payline 52 and a plurality of reels 54. In certain of these embodiments, an EGM includes a plurality of adjacent, rotatable reels that may be combined and operably coupled with an electronic display of any suitable type. In other of these embodiments, if the reels are in video form, one or more of the display devices described above display the plurality of simulated video reels. Each reel displays a plurality of indicia or symbols, such as bells, hearts, fruits, numbers, letters, bars, or other images that typically correspond to a theme associated with the EGM. In certain other of these embodiments, one or more of the reels are independent reels or unisymbol reels. In these embodiments, each independent or unisymbol reel generates and displays one symbol.

In certain embodiments, one or more of the paylines may be horizontal, vertical, circular, diagonal, angled, or any suitable combination thereof. In other embodiments, one or more of the paylines each includes a plurality of adjacent symbol display positions on a requisite number of adjacent reels. In one such embodiment, one or more paylines are formed between at least two symbol display positions that are adjacent to each other by either sharing a common side or sharing a common corner (i.e., such paylines are connected paylines). In these embodiments, the EGM enables a player to wager on one or more of such paylines to activate such paylines.

In other embodiments wherein one or more paylines are formed between at least two symbol display positions which are adjacent to each other, the EGM enables a player to wager on and thus activate a plurality of symbol display positions. In these embodiments, one or more paylines that are formed from a plurality of adjacent active symbol display positions on a requisite number of adjacent reels are activated.

In various embodiments, an EGM awards prizes after the reels of a primary game stop spinning if specified types and/or configurations of indicia or symbols occur on an active payline or otherwise occur in a winning pattern, occur on the requisite number of adjacent reels, and/or occur in a scatter pay arrangement.

In other embodiments, rather than determining any outcome to provide to a player by analyzing the symbols generated on any wagered upon paylines as described above, the EGM determines any outcome to provide to the player based on the number of associated symbols which are generated in active symbol display positions on the requisite number of adjacent reels (i.e., not on paylines passing through any displayed winning symbol combinations). In these embodiments, if a winning symbol combination is generated on the reels, the EGM provides the player one award for that occurrence of the generated winning symbol combination. For example, if one winning symbol combination is generated on the reels, the EGM will provide a single award to the player for that winning symbol combination (i.e., not based on the number of paylines that would have passed through that winning symbol combination). It should be appreciated that because an EGM that enables wagering on ways to win provides the player one award for a single occurrence of a winning symbol combination, and an EGM with paylines may provide the player more than one award for the same occurrence of a single winning symbol combination (i.e., if a plurality of paylines each pass through the same winning symbol combination), it is possible to provide a player at a ways to win EGM with more ways to win for an equivalent bet or wager on a traditional slot EGM with paylines.

In certain embodiments, a total number of ways to win is determined by multiplying the number of symbols generated in active symbol display positions on a first reel by the number of symbols generated in active symbol display positions on a second reel by the number of symbols generated in active symbol display positions on a third reel and so on for each reel of the EGM with at least one symbol generated in an active symbol display position. For example, a three reel EGM with three symbols generated in active symbol display positions on each reel includes 27 ways to win (i.e., 3 symbols on the first reel×3 symbols on the second reel×3 symbols on the third reel). A four reel EGM with three symbols generated in active symbol display positions on each reel includes 81 ways to win (i.e., 3 symbols on the first reel×3 symbols on the second reel×3 symbols on the third reel×3 symbols on the fourth reel). A five reel EGM with three symbols generated in active symbol display positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol display positions by one or more of the reels modifies the number of ways to win.

In various embodiments, the EGM enables a player to wager on and thus activate symbol display positions. In one such embodiment, the symbol display positions are on the reels. In this embodiment, if, based on the player's wager, a reel is activated, then each of the symbol display positions of that reel will be activated and each of the active symbol display positions will be part of one or more of the ways to win. In another such embodiment, if, based on the player's wager, a reel is not activated, then a designated number of default symbol display positions, such as a single symbol display position of the middle row of the reel, will be activated and the default symbol display position(s) will be part of one or more of the ways to win. This type of EGM enables a player to wager on one, more than one, or all of the reels, and the processor of the EGM uses the number of wagered on reels to determine the active symbol display positions and the number of possible ways to win. In alternative embodiments: (a) no symbols are displayed as generated at any of the inactive symbol display positions, or (b) any symbols generated at any inactive symbol display positions may be displayed to the player but suitably shaded or otherwise designated as inactive.

In one example embodiment wherein a player wagers on one or more reels, a player's wager of one credit may activate each of the three symbol display positions on a first reel, wherein one default symbol display position is activated on each of the remaining four reels. In this example, as described above, the EGM provides the player three ways to win (i.e., 3 symbols on the first reel×1 symbol on the second reel×1 symbol on the third reel×1 symbol on the fourth reel×1 symbol on the fifth reel). In another example embodiment, a player's wager of nine credits may activate each of the three symbol display positions on a first reel, each of the three symbol display positions on a second reel and each of the three symbol display positions on a third reel wherein one default symbol display position is activated on each of the remaining two reels. In this example, as described above, the EGM provides the player twenty-seven ways to win (i.e., 3 symbols on the first reel×3 symbols on the second reel×3 symbols on the third reel×1 symbol on the fourth reel×1 symbol on the fifth reel).

In various embodiments, to determine any award(s) to provide to the player based on the generated symbols, the EGM individually determines if a symbol generated in an active symbol display position on a first reel forms part of a winning symbol combination with or is otherwise suitably related to a symbol generated in an active symbol display position on a second reel. In this embodiment, the EGM classifies each pair of symbols that form part of a winning symbol combination (i.e., each pair of related symbols) as a string of related symbols. For example, if active symbol display positions include a first cherry symbol generated in the top row of a first reel and a second cherry symbol generated in the bottom row of a second reel, the EGM classifies the two cherry symbols as a string of related symbols because the two cherry symbols form part of a winning symbol combination.

After determining if any strings of related symbols are formed between the symbols on the first reel and the symbols on the second reel, the EGM determines if any of the symbols from the next adjacent reel should be added to any of the formed strings of related symbols. In these embodiments, for a first of the classified strings of related symbols, the EGM determines if any of the symbols generated by the next adjacent reel form part of a winning symbol combination or are otherwise related to the symbols of the first string of related symbols. If the EGM determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the EGM adds the related cherry symbol generated on the third reel to the previously classified string of cherry symbols.

On the other hand, if the EGM determines that no symbols generated on the next adjacent reel are related to the symbols of the first string of related symbols, the EGM marks or flags such string of related symbols as complete. For example, if the first string of related symbols is the string of related cherry symbols and none of the symbols of the third reel are related to the cherry symbols of the previously classified string of cherry symbols, the EGM marks or flags the string of two cherry symbols as complete.

After either adding a related symbol to the first string of related symbols or marking the first string of related symbols as complete, the EGM proceeds as described above for each of the remaining classified strings of related symbols that were previously classified or formed from related symbols on the first and second reels.

After analyzing each of the remaining strings of related symbols, the EGM determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the EGM marks each of the remaining pending strings of related symbols as complete.

When each of the strings of related symbols is marked complete, the EGM compares each of the strings of related symbols to an appropriate paytable and provides the player any award associated with each of the completed strings of symbols. It should be appreciated that the player is provided one award, if any, for each string of related symbols generated in active symbol display positions (i.e., as opposed to a quantity of awards being based on how many paylines that would have passed through each of the strings of related symbols in active symbol display positions).

In certain embodiments, the primary game is a poker game wherein the EGM enables the player to play a conventional game of video draw poker and initially deals five cards all face up from a virtual deck of fifty-two cards. Cards may be dealt as in a traditional game of cards or, in the case of the EGM, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the EGM deals the replacement cards from the remaining cards in the deck. This results in a final five-card hand. The EGM compares the final five-card hand to a payout table which utilizes conventional poker hand rankings to determine the winning hands. The EGM provides the player with an award based on a winning hand and the number of credits the player wagered.

In other embodiments, the primary game is a multi-hand version of video poker. In these embodiments, the EGM deals the player at least two hands of cards. In one of these embodiments, the cards are the same cards. In another of these embodiments, each hand of cards is associated with its own deck of cards. The player chooses the cards to hold in a primary hand. The held cards in the primary hand are also held in the other hands of cards. The remaining non-held cards are removed from each displayed hand, and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In other embodiments, the primary game is a keno game wherein the EGM displays a plurality of selectable indicia or numbers on at least one of the display devices. In these embodiments, the player selects at least one bit potentially a plurality of the selectable indicia or numbers via an input device such as a touch screen. The EGM then displays a series of drawn numbers and determine an amount of matches, if any, between the player's selected numbers and the EGM's drawn numbers. The player is provided an award based on the amount of matches, if any, based on the amount of determined matches and the number of numbers drawn.

In certain embodiments, in addition to winning credits or other awards in the primary game, the EGM gives players the opportunity to win credits in a secondary game or secondary round. The secondary game enables the player to obtain a prize or payout in addition to the prize or payout, if any, obtained from the primary game. In general, the secondary game produces a significantly higher level of player excitement than the primary game because it provides a greater expectation of winning than the primary game, and is accompanied with more attractive or unusual features than the primary game. In one embodiment, the secondary game may be any type of suitable game, either similar to or completely different from the primary game.

In various embodiments, the EGM automatically provides or initiates the secondary game upon the occurrence of a triggering event or the satisfaction of a qualifying condition. In other embodiments, the EGM enables a player to choose whether to initiate the secondary game upon the occurrence of the triggering event or the satisfaction of the qualifying condition. In certain embodiments, the triggering event or qualifying condition may be a selected outcome in the primary game or a particular arrangement of one or more indicia on a display device in the primary game, such as the number seven appearing on three adjacent reels along a payline in the primary game. In other embodiments, the triggering event or qualifying condition occurs based on exceeding a certain amount of game play (such as number of games, number of credits, amount of time), or reaching a specified number of points earned during game play. It should be appreciated that any suitable triggering event or qualifying condition or any suitable combination of a plurality of different triggering events or qualifying conditions may be employed.

In other embodiments, the EGM processor or central controller randomly provides a player one or more plays of one or more secondary games. In one such embodiment, the EGM does not provide any apparent reason to the player for qualifying the player to play the secondary game. In this embodiment, qualifying for a secondary game is not triggered by an event in or based specifically on any of the plays of any primary game. That is, the EGM may simply qualify the player to play the secondary game without any explanation or, alternatively, with simple explanations. In another such embodiment, the EGM (or central server) qualifies a player for a secondary game at least partially based on a game triggered or symbol triggered event, such as at least partially based on the play of a primary game.

In various embodiments, after a player has qualified for a secondary game, the player may subsequently enhance the player's secondary game participation through continued play on the primary game. Thus, for each secondary game qualifying event, such as a secondary game symbol, that the player obtains, a given number of secondary game wagering points or credits may be accumulated in a "secondary game meter" programmed to accrue the secondary game wagering credits or entries toward eventual participation in the secondary game. The occurrence of multiple such secondary game qualifying events in the primary game may result in an arithmetic or exponential increase in the number of secondary game wagering credits awarded. In one embodiment, the player may redeem extra secondary game wagering credits during the secondary game to extend play of the secondary game.

In some embodiments, no separate entry fee or buy-in for the secondary game is required. That is, a player may not purchase entry into the secondary game; rather the player must win or earn entry through play of the primary game, thereby encouraging play of the primary game. In other embodiments, qualification for the secondary game is accomplished through a simple "buy-in" by the player. For example, if the player has been unsuccessful at qualifying through other specified activities, the player may pay a fee or place an additional wager to "buy-in" to the secondary game. In certain embodiments, a player must make a separate side wager on the secondary game or wager a designated amount in the primary game to qualify for the secondary game. In these embodiments, the secondary game triggering event must occur and the side wager (or designated primary game wager amount) must have been placed to trigger the secondary game.

It should be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method comprising:

(a) causing an electronic gaming machine to operate in a default mode in which the electronic gaming machine has a default average expected payback percentage for each play of a wagering game;

(b) causing at least one processor to determine a point in time at which the at least one processor should determine if the electronic gaming machine should operate in a hot mode, the electronic gaming machine having a greater average expected payback percentage for each play of the wagering game in the hot mode;

(c) at the determined point in time, regardless of whether the electronic gaming machine is being played, causing the at least one processor to determine if the electronic gaming machine should operate in the hot mode;

(d) after the at least one processor determines that the electronic gaming machine should operate in the hot mode, causing the electronic gaming machine to operate in the hot mode for a designated period of play; and (e) when the electronic gaming machine is part of a group of electronic gaming machines played by a plurality of players and when the electronic gaming machine is in the hot mode, causing a display of an indication that one of the electronic gaming machines of the group is in the hot mode without informing any of the plurality of players which of the electronic gaming machines in the group is in the hot mode.

2. The method of claim 1, wherein the at least one processor is a processor of the electronic gaming machine.

3. The method of claim 1, wherein the at least one processor is a processor of a central controller associated with the electronic gaming machine.

4. The method of claim 1, wherein the determined point in time is one of: (a) randomly determined, (b) one of a schedule of regular intervals, and (c) after an occurrence of a designated triggering event.

5. The method of claim 1, which includes causing the at least one processor to determine if the electronic gaming machine should operate in the hot mode independent of any determination of whether any other electronic gaming machines in the group of electronic gaming machines are in the hot mode.

6. The method of claim 1, which includes causing the at least one processor to determine if the electronic gaming machine should operate in the hot mode at least in part based on whether any other electronic gaming machines in the group of electronic gaming machines are in the hot mode.

7. The method of claim 1, wherein causing the at least one processor to determine if the electronic gaming machine should operate in the hot mode includes causing the at least one processor to randomly determine if the electronic gaming machine should operate in the hot mode.

8. The method of claim 1, which includes causing the at least one processor to determine a length of the designated period of play based on one of: (a) a predefined static period, (b) a randomly determined schedule, and (c) a predetermined schedule.

9. The method of claim 1, wherein the designated period of play: (a) is a designated quantity of plays of the wagering game, (b) is a designated period of time, (c) continues until one or more designated terminating events occur, (d) continues until a designated amount is won, (e) continues until a designated amount is lost, or (f) continues until a certain number of winning outcomes occur.

10. The method of claim 1, which is in part provided through a data network.

11. The method of claim 10, wherein the data network is an internet.

12. A gaming system comprising:

at least one processor; and at least one memory device storing a plurality of instructions which, when executed by the at least one processor, cause the at least one processor to:

(a) cause an electronic gaming machine to operate in a default mode in which the electronic gaming machine has a default average expected payback percentage for each play of a wagering game;

(b) determine a point in time at which the at least one processor should determine if the electronic gaming machine should operate in a hot mode, the electronic gaming machine having a greater average expected payback percentage for each play of the wagering game in the hot mode;

(c) at the determined point in time, regardless of whether the electronic gaming machine is being played, determine if the electronic gaming machine should operate in the hot mode;

(d) after the at least one processor determines that the electronic gaming machine should operate in the hot mode, cause the electronic gaming machine to operate in the hot mode for a designated period of play; and (e) when the electronic gaming machine is part of a group of electronic gaming machines played by a plurality of players and when the electronic gaming machine is in the hot mode, cause a display of an indication that one of the electronic gaming machines of the group is in the hot mode without informing any of the plurality of players which of the electronic gaming machines in the group is in the hot mode.

13. The gaming system of claim 12, wherein the at least one processor is a processor of the electronic gaming machine.

14. The gaming system of claim 12, wherein the at least one processor is a processor of a central controller associated with the electronic gaming machine.

15. The gaming system of claim 12, wherein the determined point in time is one of: (a) randomly determined, (b) one of a schedule of regular intervals, and (c) after an occurrence of a designated triggering event.

16. The gaming system of claim 12, wherein the plurality of instructions, when executed by the at least one processor, cause the at least one processor to determine if the electronic gaming machine should operate in the hot mode independent of any determination of whether any other electronic gaming machines in the group of electronic gaming machines are in the hot mode.

17. The gaming system of claim 12, wherein the plurality of instructions, when executed by the at least one processor, cause the at least one processor to determine if the electronic gaming machine should operate in the hot mode at least on part based on whether any other electronic gaming machines in the group of electronic gaming machines are in the hot mode.

18. The gaming system of claim 12, wherein the plurality of instructions, when executed by the at least one processor, cause the at least one processor to determine if the electronic gaming machine should operate in the hot mode by randomly determining if the electronic gaming machine should operate in the hot mode.

19. The gaming system of claim 12, wherein the plurality of instructions, when executed by the at least one processor, cause the at least one processor to determine a length of the designated period of play based on one of: (a) a predefined static period, (b) a randomly determined schedule, and (c) a predetermined schedule.

20. The gaming system of claim 12, wherein the designated period of play: (a) is a designated quantity of plays of the wagering game, (b) is a designated period of time, (c) continues until one or more designated terminating events occur, (d) continues until a designated amount is won, (e) continues until a designated amount is lost, or (f) continues until a certain number of winning outcomes occur.

* * * * *